(12) United States Patent
Fujinami

(10) Patent No.: US 7,720,348 B2
(45) Date of Patent: May 18, 2010

(54) IMAGE PROCESSING APPARATUS AND IMAGE PROCESSING METHOD AS WELL AS RECORDING MEDIUM

(75) Inventor: Yasushi Fujinami, Kanagawa (JP)

(73) Assignee: Sony Corporation, Tokyo (JP)

( * ) Notice: Subject to any disclaimer, the term of this patent is extended or adjusted under 35 U.S.C. 154(b) by 1519 days.

(21) Appl. No.: 09/920,104

(22) Filed: Aug. 1, 2001

(65) Prior Publication Data
US 2002/0085829 A1 Jul. 4, 2002

(30) Foreign Application Priority Data
Aug. 2, 2000 (JP) .............................. 2000-233923

(51) Int. Cl.
*H04N 5/91* (2006.01)
(52) U.S. Cl. ............................... 386/46; 386/1; 386/83; 386/32; 386/68
(58) Field of Classification Search .................... 386/46, 386/1, 83, 32, 68, 52; 360/32
See application file for complete search history.

(56) References Cited

U.S. PATENT DOCUMENTS

| | | | | |
|---|---|---|---|---|
| 5,412,418 A | * | 5/1995 | Nishimura et al. | 348/14.06 |
| 5,442,452 A | * | 8/1995 | Ryu | 386/97 |
| 5,781,734 A | * | 7/1998 | Ohno et al. | 725/115 |
| 5,815,631 A | * | 9/1998 | Sugiyama et al. | 386/46 |
| 5,848,240 A | * | 12/1998 | Yamamoto | 709/213 |
| 6,020,916 A | * | 2/2000 | Gerszberg et al. | 348/14.07 |
| 6,191,822 B1 | * | 2/2001 | Smyers | 348/552 |
| 6,504,996 B1 | * | 1/2003 | Na et al. | 386/125 |
| 2002/0026458 A1 | * | 2/2002 | Fujinami | 707/501.1 |

FOREIGN PATENT DOCUMENTS

| | | |
|---|---|---|
| EP | 0 833 514 | 4/1998 |
| EP | 0 835 029 | 4/1998 |
| EP | 0 873 009 | 10/1998 |
| EP | 0 889 649 | 1/1999 |
| EP | 0 993 185 | * 10/1999 |
| EP | 0 993 185 | 4/2000 |
| GB | 2 341 298 | 3/2000 |
| JP | 2000 69430 | 3/2000 |
| WO | WO 00 31971 | 6/2000 |

* cited by examiner

*Primary Examiner*—Thai Tran
*Assistant Examiner*—Helen Shibru
(74) *Attorney, Agent, or Firm*—Frommer Lawrence & Haug LLP; William S. Frommer

(57) ABSTRACT

The invention provides an image processing apparatus and an image processing method by which efficient communication can be achieved. An image processing apparatus, comprising a playback section for playing back image data; a transmission section for transmitting the played back image data to a reception apparatus through a predetermined transmission line; and a control section for controlling, when an instruction to temporarily stop the playback of the image data is received, the playback section and the transmission section to stop the playback and the transmission of the image data, respectively, and further controlling the transmission section to transmit a message representing that the playback of the image data is temporarily stopped to the reception apparatus through the transmission line.

29 Claims, 22 Drawing Sheets

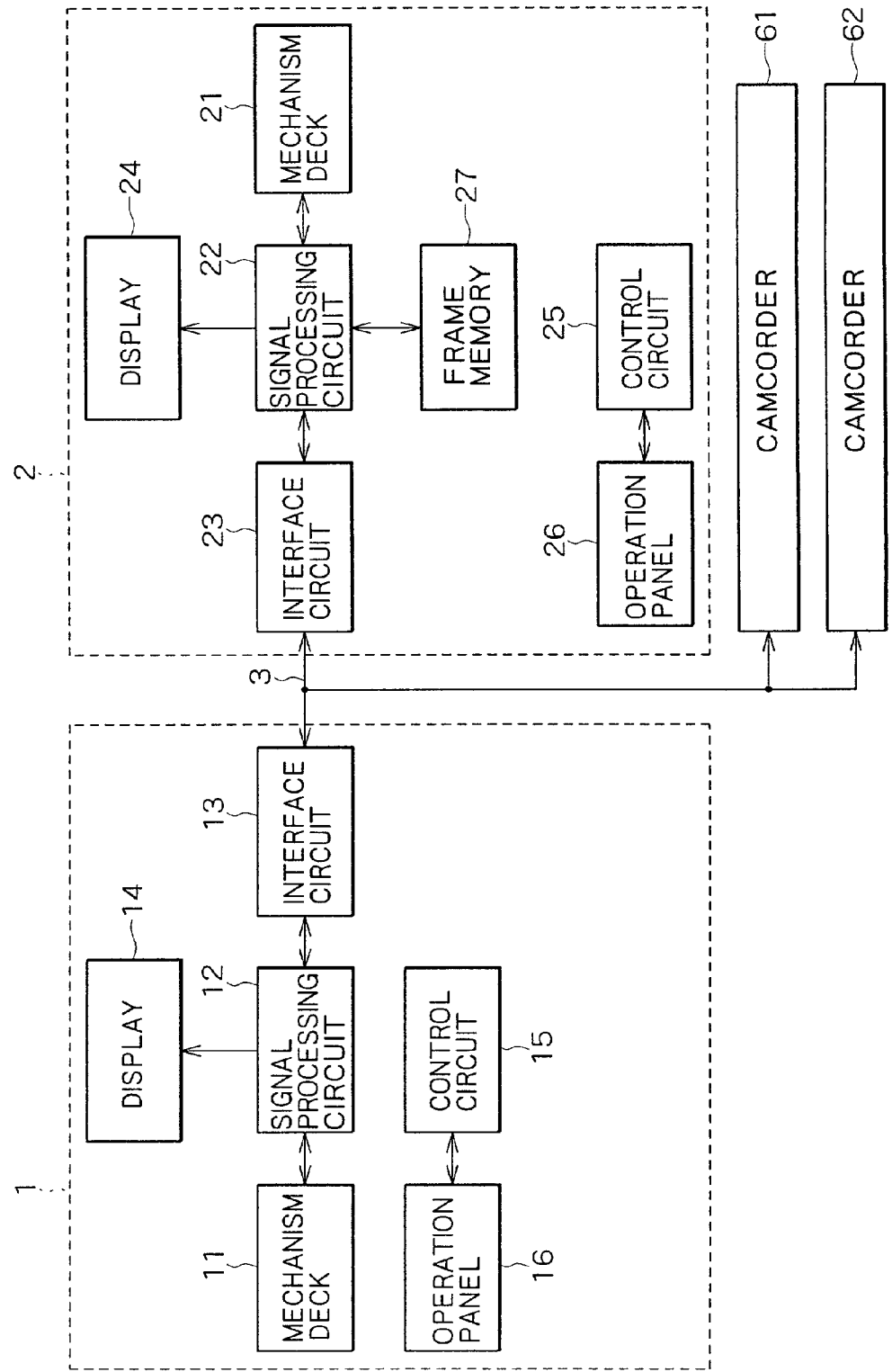

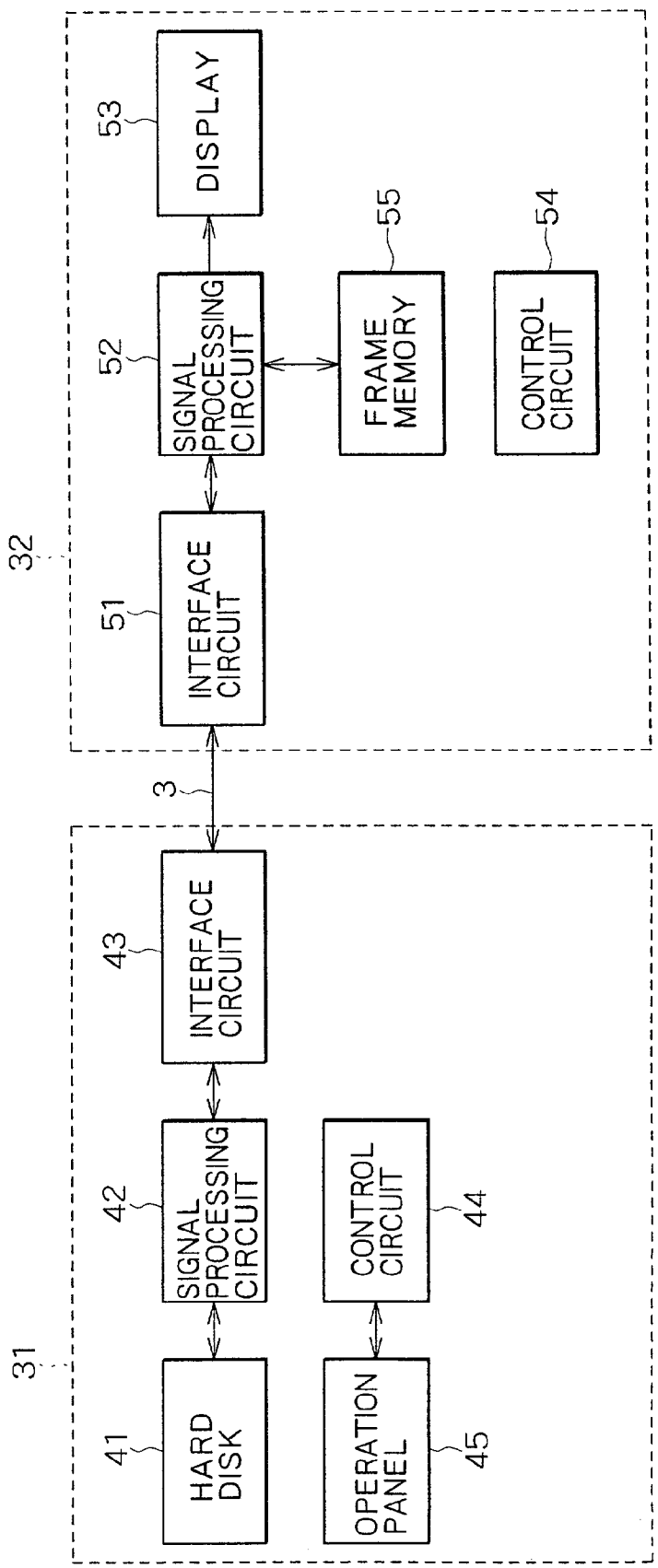

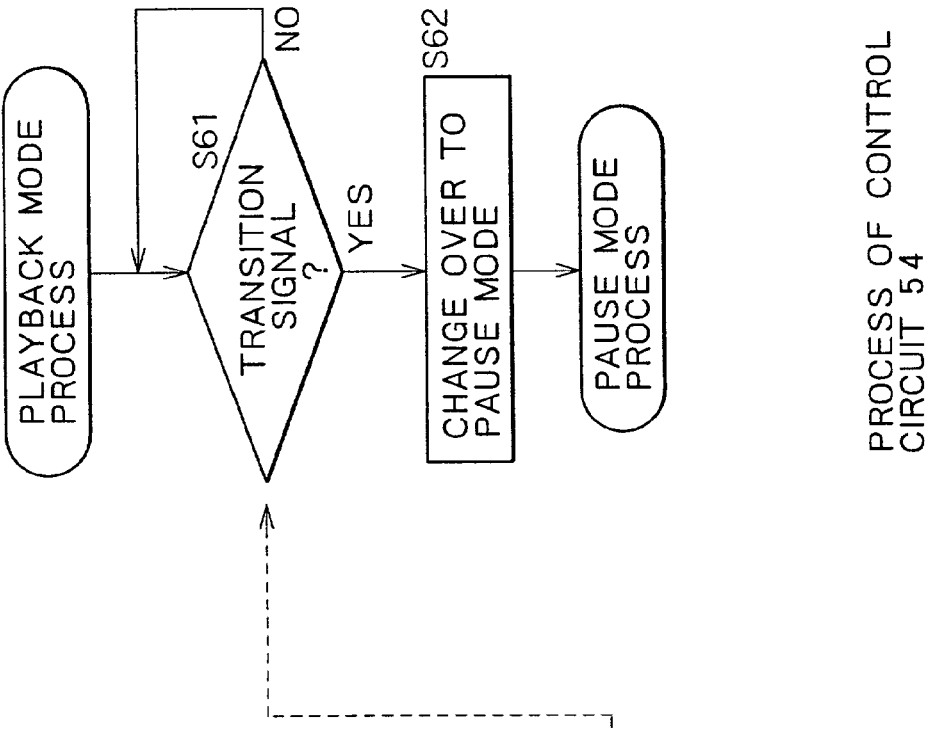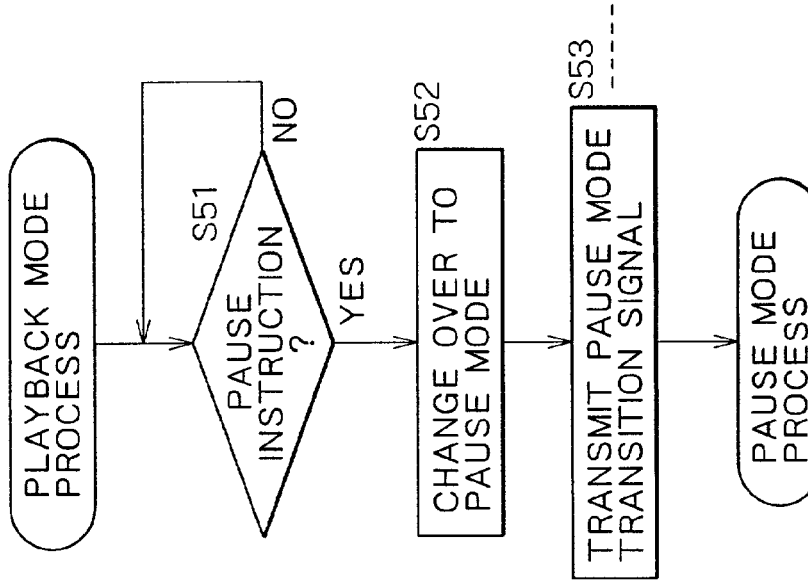

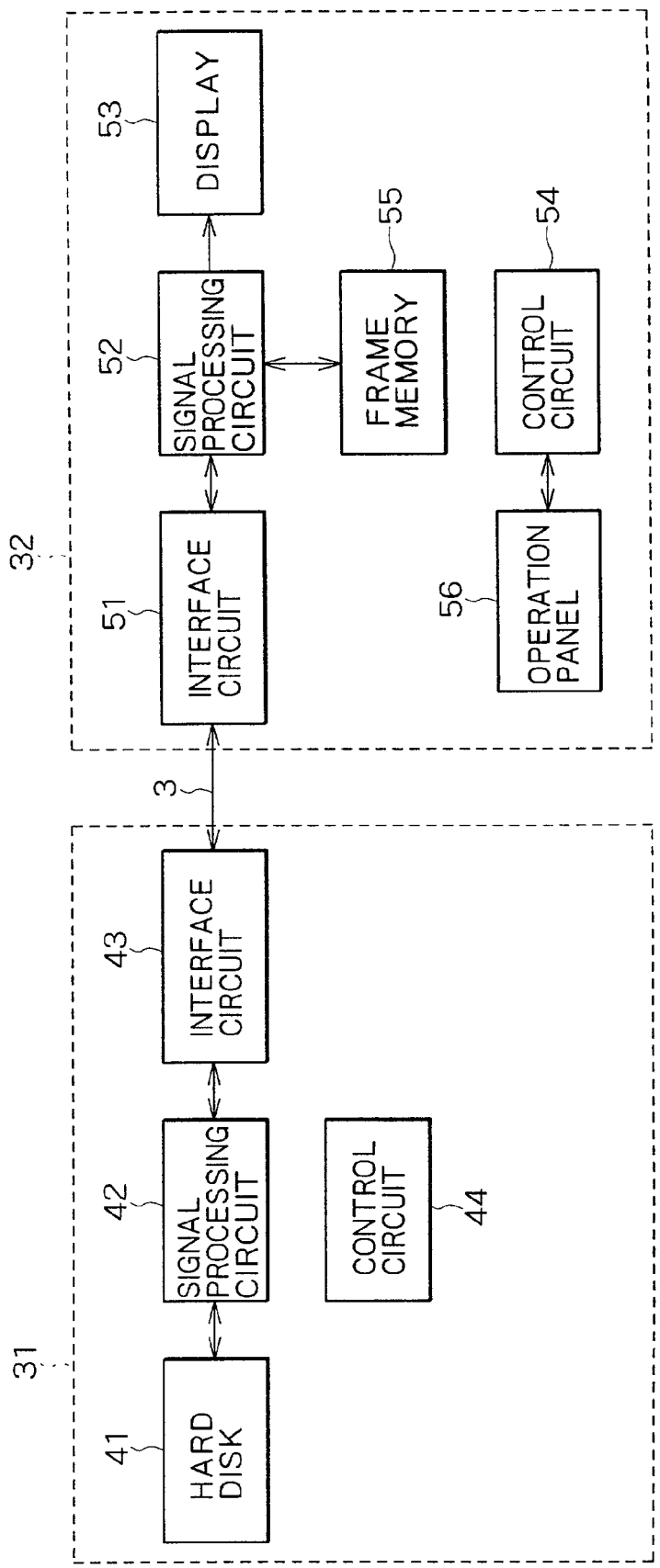

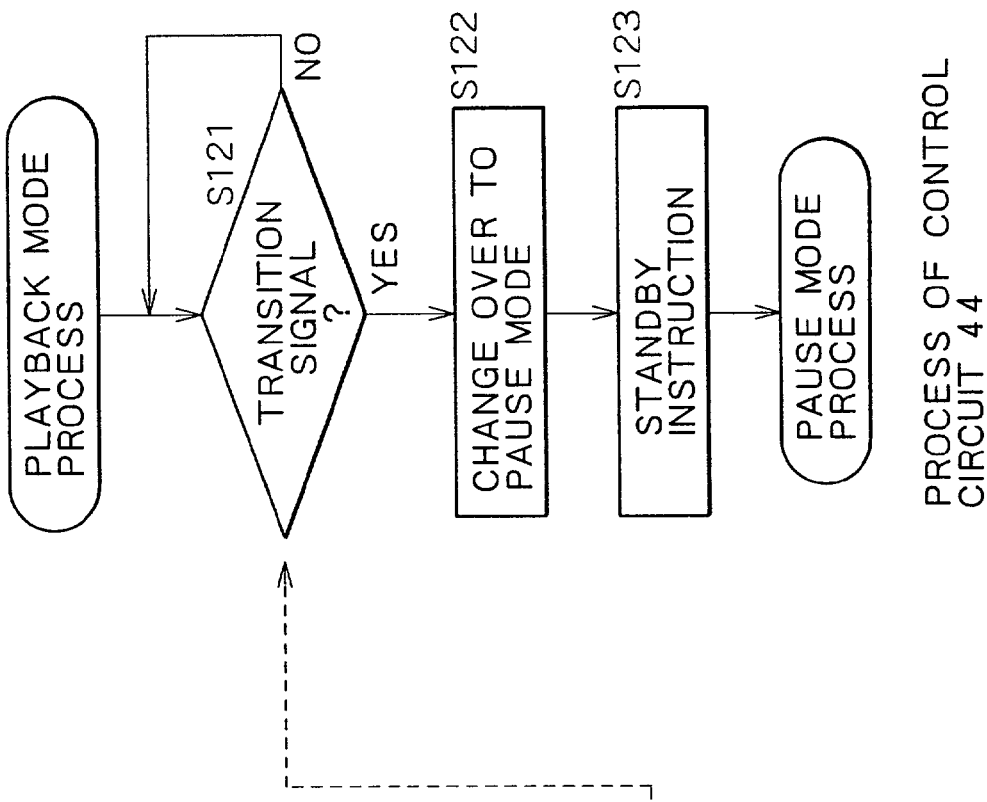
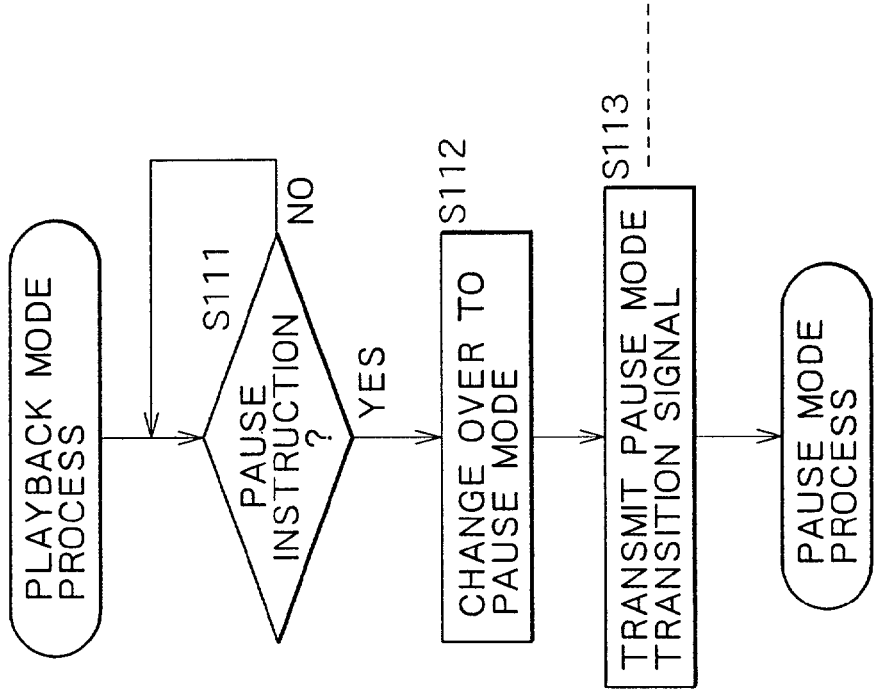

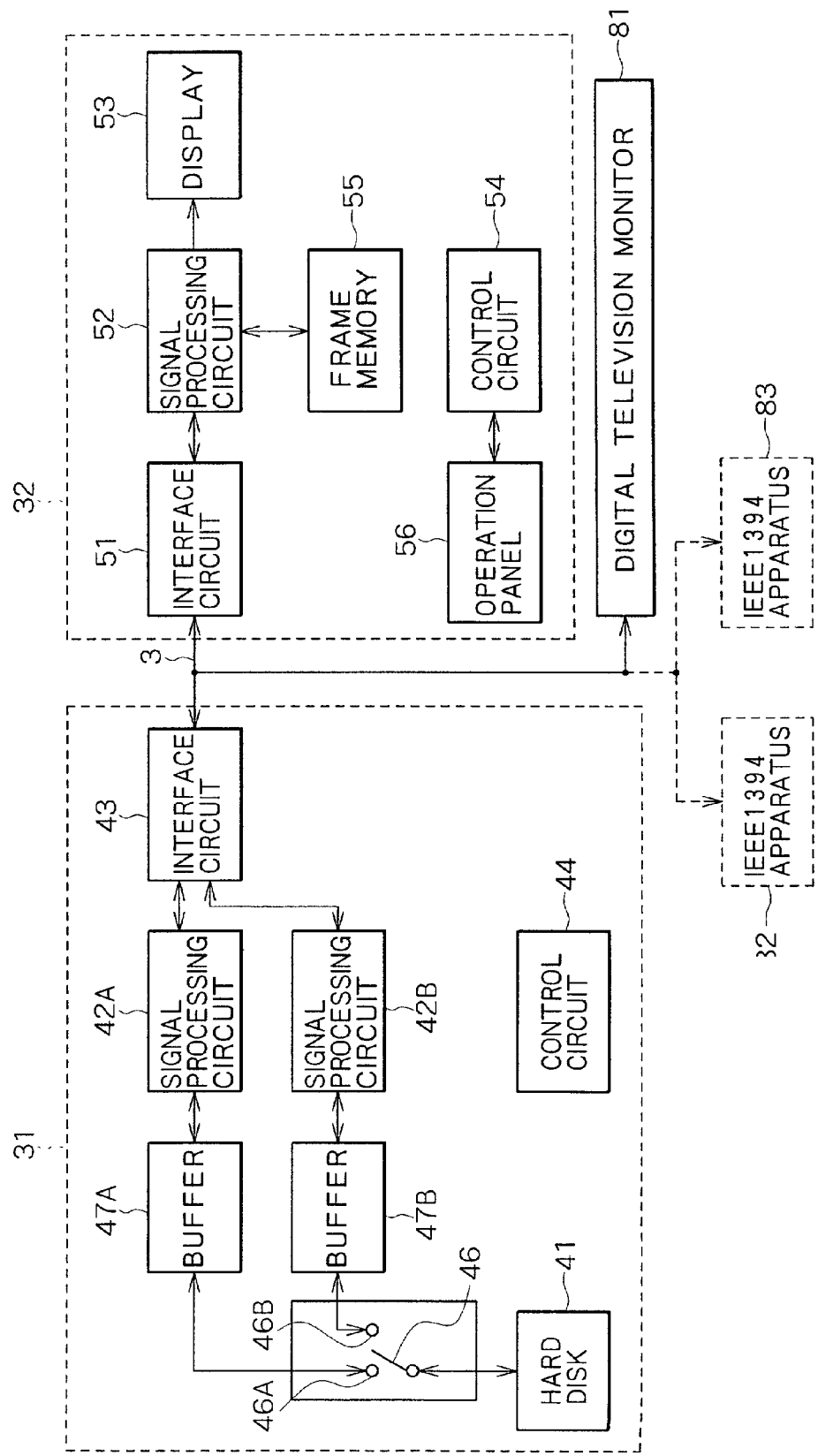

IMAGE PROCESSING APPARATUS AND IMAGE PROCESSING METHOD AS WELL AS RECORDING MEDIUM

BACKGROUND OF THE INVENTION

This invention relates to an image processing apparatus and an image processing method as well as a recording medium, and more particularly to an image processing apparatus and an image processing method as well as a recording medium by which a network which complies with the standard of the IEEE (Institute of Electrical and Electronics Engineers) 1394 or the like can be used efficiently.

Communication in accordance with the IEEE 1394 standard which is one of standards for a digital interface allows isochronous transfer of data and therefore is suitable for transfer of data which need be played back on the real time basis such as image and sound data. Further, also from an increase in demand for communication of multimedia data in recent years, much attention is paid to the communication in accordance with the IEEE 1394 standard.

FIG. 1 shows a configuration of an example of an AV (Audio Visual) system (the term "system" is used herein to signify a plurality of apparatus gathered logically irrespective of whether or not the apparatus are accommodated in the same housing) which allows communication in accordance with the IEEE 1394 standard.

The AV system of FIG. 1 includes two camcorders (video camcorders) 1 and 2 of the DV (Digital Video) system which are IEEE 1394 apparatus as apparatus which comply with the IEEE 1394 standard, and an IEEE 1394 cable 3. The camcorders 1 and 2 are connected to each other by the IEEE 1394 cable 3.

It is to be noted that, in the following description, in order to avoid complicated description, description is given only of image data from between image data and sound data. Further, in the following description, it is assumed that image and sound data played back by the camcorder 1 are transmitted by the IEEE 1394 cable 3 to and outputted from the camcorder 2.

FIG. 2 shows an example of configuration of the camcorders 1 and 2 of FIG. 1.

The camcorder 1 includes a mechanism deck 11, a signal processing circuit 12, an interface circuit 13, a display 14, a control circuit 15, and an operation panel 16.

The mechanism deck 11 records image data supplied thereto from the signal processing circuit 12 onto a video tape not shown, and plays back image data from the video tape and supplies the played back image data to the signal processing circuit 12.

The signal processing circuit 12 performs necessary signal processing for image data supplied thereto from the interface circuit 13 and supplies the processed image data to the mechanism deck 11. Further, the signal processing circuit 12 performs necessary signal processing for image data supplied thereto from the mechanism deck 11 and supplies the processed image data to the interface circuit 13 and the display 14.

The interface circuit 13 functions as an interface for allowing communication compliant with the IEEE 1394 standard. In particular, the interface circuit 13 converts the format of image data and other data supplied thereto from the signal processing circuit 12 into that of data compliant with the IEEE 1394 standard and transmits the resulting data to the IEEE 1394 cable 3. Further, the interface circuit 13 receives image data and other data from the IEEE 1394 cable 3, converts the format of the received data back into its original format and supplies the data of the original format to the signal processing circuit 12.

The display 14 is formed from, for example, a CRT (Cathode Ray Tube) or a liquid crystal panel and displays image data from the signal processing circuit 12.

The control circuit 15 controls the mechanism deck 11, signal processing circuit 12, interface circuit 13 and display 14 in response to an operation signal from the operation panel 16 and so forth.

The operation panel 16 includes buttons and so forth to be operated in order to input various instructions such as playback of image data, pause or fast feeding, and supplies an operation signal corresponding to an operated button to the control circuit 15. It is to be noted that the operation panel 16 may otherwise be a panel provided integrally on the camcorder 1 or a remote commander for remotely controlling the camcorder 1.

The camcorder 2 includes a mechanism deck 21, a signal processing circuit 22, an interface circuit 23, a display 24, a control circuit 25 and an operation panel 26 which have configurations similar to those of the mechanism deck 11, signal processing circuit 12, interface circuit 13, display 14, control circuit 15 and operation panel 16 of the camcorder 1, respectively.

Now, operation of the AV system of FIG. 2 is described.

First, for example, in order to cause the camcorder 1 to record image data, the user will connect an image inputting apparatus (not shown) which can input an image such as a video camera to the interface circuit 13 using the IEEE 1394 cable 3, and operate the button (recording button) of the operation panel 16 for inputting a recording instruction. In this instance, the operation panel 16 supplies an operation signal for a recording instruction to the control circuit 15. When the control circuit 15 receives the operation signal for a recording instruction, it sets the operation mode of the apparatus to a recording mode.

Thereafter, when image data are inputted from the image inputting apparatus to the interface circuit 13 through the IEEE 1394 cable 3, the interface circuit 13 receives the image data and supplies the image data to the signal processing circuit 12.

The signal processing circuit 12 performs predetermined signal processing for the image data from the interface circuit 13 and supplies the processed image data to the mechanism deck 11. The mechanism deck 11 records the image data from the signal processing circuit 12 onto the video tape.

On the other hand, in order to play back image data recorded by the camcorder 1 and transmit the image data to the camcorder 2 so that the image data are displayed by the camcorder 2, the user will operate the button (playback button) of the operation panel 16 for inputting a playback (normal playback) instruction. In this instance, the operation panel 16 supplies an operation signal for a playback instruction to the control circuit 15. The control circuit 15 receives the operation signal for a playback instruction and sets the operation mode of the apparatus to a playback mode.

After the playback mode is entered, the mechanism deck 11 starts playback of image data from the video tape and supplies the played back image data to the signal processing circuit 12. The signal processing circuit 12 performs predetermined signal processing for the image data from the mechanism deck 11, and supplies image data of, for example, the NTSC (National Television System Committee) system to the interface circuit 13 and supplies the image data to the display 14 so as to be displayed on the display 14. The interface circuit 13 transmits the image data from the signal processing circuit 12 to the camcorder 2 through the IEEE 1394 cable 3.

The image data transmitted from the camcorder 1 through the IEEE 1394 cable 3 in such a manner as described above are received by the interface circuit 23 of the camcorder 2. After the interface circuit 23 starts reception of the image data, it notifies the control circuit 25 that image data are inputted thereto. In this instance, the control circuit 25 sets the operation mode of the apparatus to an input mode.

After the input mode is entered, the interface circuit 23 supplies the image data received from the IEEE 1394 cable 3 to the signal processing circuit 22. The signal processing circuit 22 supplies the image data from the interface circuit 23 to the display 24 so that the image data are displayed on the display 24.

Then, if the user thereafter operates the button (recording button) of the operation panel 26 for inputting a recording instruction, then the operation panel 26 supplies an operation signal for a recording instruction to the control circuit 25. In this instance, the control circuit 25 sets the operation mode of the apparatus to a recording mode. After the recording mode is entered, the signal processing circuit 22 supplies the image data from the interface circuit 23 not only to the display 24 but also to the mechanism deck 21. The mechanism deck 21 records the image data supplied thereto from the signal processing circuit 22 in such a manner as described above onto the video tape.

Here, if the power supply to the camcorder 1 and the camcorder 2 is placed into an on state, then the interface circuit 13 of the camcorder 1 and the interface circuit 23 of the camcorder 2 recognize IEEE 1394 apparatus connected thereto by the IEEE 1394 cable 3 (in FIG. 2, the camcorders 1 and 2) and establish a cannel (logical channel) for use for delivery of image data. Then, between the camcorders 1 and 2, data are communicated through the channel. It is to be noted that detailed description of establishment of a channel in the IEEE 1394 is omitted herein.

Then, if the user operates, for example, the button (fast feed button) of the operation panel 16 for inputting a fast feed (Fast Forward) instruction, then the operation panel 16 supplies an operation signal for a fast feed instruction to the control circuit 15. In this instance, the control circuit 15 sets the operation mode of the apparatus to a fast feed mode.

After the fast feed mode is entered, the mechanism deck 11 feeds the video tape at a speed equal to several times that for playback at a normal speed (normal playback) to play back image data intermittently and supplies the played back image data to the signal processing circuit 12. The signal processing circuit 12 processes the intermittent image data from the mechanism deck 11 to produce normal image data of the NTSC system and supplies the image data to the interface circuit 13 and also to the display 14 so that the image data are displayed on the display 14. The interface circuit 13 sends the image data from the signal processing circuit 12 to the camcorder 2 through the IEEE 1394 cable 3.

The camcorder 2 controls the display 24 to display the image data from the camcorder 1 in a similar manner to that in the normal playback described hereinabove. It is to be noted that, while the image data transmitted thereto from the camcorder 1 in this instance are of the NTSC system, they are data of frames at intervals of several frames, and therefore, moving pictures in a fast fed state are displayed on the display 24.

Then, if the user operates, for example, the button (pause button) of the operation panel 16 for inputting a pause (temporarily stop) instruction, then the operation panel 16 supplies an operation signal for a pause instruction to the control circuit 15. In this instance, the control circuit 15 sets the operation mode of the apparatus to a pause mode.

After the pause mode is entered, the mechanism deck 11 stops feeding of the video tape and supplies image data of the same frame obtained by repetitively scanning the same portion of the video tape to the signal processing circuit 12. The signal processing circuit 12 processes the video data from the mechanism deck 11 to produce normal image data of the NTSC system and supplies the image data to the interface circuit 13 and also to the display 14 so that the image data are displayed on the display 14. The interface circuit 13 transmits the image data from the signal processing circuit 12 to the camcorder 2 through the IEEE 1394 cable 3.

The camcorder 2 controls the display 24 to display the image data from the camcorder 1 in a similar manner as in the normal playback. It is to be noted that, while the image data transmitted from the camcorder 1 are of the NTSC system, since they are of the same frame, moving pictures of a pause state are displayed on the display 24.

FIG. 3 shows another configuration of example of the AV system.

The AV system of FIG. 3 includes a hard disk recorder 31 and a digital television monitor 32 of the DV (Digital Video) system which are IEEE 1394 apparatus as apparatus which comply with the IEEE 1394 standard, and an IEEE 1394 cable 3. The hard disk recorder 31 and the digital television monitor 32 are connected to each other by the IEEE 1394 cable 3.

It is to be noted that, in the following description, it is assumed basically that an image played back by the hard disk recorder 31 is transmitted through the IEEE 1394 cable 3 to the digital television monitor 32 by which it is outputted (displayed).

The hard disk recorder 31 includes a hard disk 41, a signal processing circuit 42, an interface circuit 43, a control circuit 44 and an operation panel 45. The signal processing circuit 42, interface circuit 43, control circuit 44 and operation panel 45 are similar to the signal processing circuit 12, interface circuit 13, control circuit 15 and operation panel 16 of FIG. 2, respectively. Accordingly, the hard disk recorder 31 is configured basically similarly to the camcorder 1 of FIG. 2 except that it does not include the display 14 and includes the hard disk 41 in place of the mechanism deck 11.

The digital television monitor 32 includes a interface circuit 51, a signal processing circuit 52, an display 53 and a control circuit 54. The interface circuit 51, signal processing circuit 52, display 53 and control circuit 54 are similar to the interface circuit 23, signal processing circuit 22, display 24 and control circuit 25 of FIG. 2, respectively. Accordingly, the digital television monitor 32 is configured basically similarly to the camcorder 2 of FIG. 2 except that it does not include the mechanism deck 21 or the operation panel 26.

Now, operation of the AV system of FIG. 3 is described.

Also in the AV system of FIG. 3, similarly as in the AV system of FIG. 3, if the power supply to the hard disk recorder 31 and the digital television monitor 32 is placed into an on state, then the interface circuit 43 of the hard disk recorder 31 and the interface circuit 51 of the digital television monitor 32 recognize IEEE 1394 apparatus connected thereto by the IEEE 1394 cable 3 (in FIG. 3, the hard disk recorder 31 and the digital television monitor 32) and establish a cannel (logical channel) for use for delivery of data. Then, between the hard disk recorder 31 and the digital television monitor 32, data are delivered through the channel.

First, for example, in order to cause the hard disk recorder 31 to record image data, the user will connect an image inputting apparatus (not shown) which can input an image such as a video camera to the interface circuit 43 using the IEEE 1394 cable 3, and operate the button (recording button) of the operation panel 45 for inputting a recording instruction. In this instance, the operation panel 45 supplies an operation signal for a recording instruction to the control circuit 44. When the control circuit 44 receives the operation signal for a recording instruction, it sets the operation mode of the apparatus to a recording mode.

Thereafter, when image data are inputted from the image inputting apparatus to the interface circuit 43 through the IEEE 1394 cable 3, the interface circuit 43 receives the image data and supplies the image data to the signal processing circuit 42.

The signal processing circuit 42 performs necessary signal processing for the image data from the interface circuit 43 such as, for example, conversion into image data of the DV system and supplies the resulting image data to the hard disk 41 so as to be recorded onto the hard disk 41.

On the other hand, in order to play back image data recorded by the hard disk recorder 31 and transmit the image data to the digital television monitor 32 so that the image data are displayed, the user will operate the button (playback button) of the operation panel 45 for inputting a playback (normal playback) instruction. In this instance, the operation panel 45 supplies an operation signal for a playback instruction to the control circuit 44. The control circuit 44 receives the operation signal for a playback instruction and sets the operation mode of the apparatus to a playback mode.

After the playback mode is entered, the signal processing circuit 42 starts playback of image data from the hard disk 41. It is to be noted that, if the user operates the operation panel 45 to designate image data (contents) to be played back, then the signal processing circuit 42 starts playback of the image data designated by the user beginning with the top of the image data. On the other hand, for example, if the user does not particularly designate image data to be played back, then the signal processing circuit 42 starts playback from a position of the hard disk 41 determined in advance (for example, from a position at which the last playback ended).

The signal processing circuit 42 decodes the image data played back from the hard disk 41 and outputs the decoded image data from an output terminal not shown. In particular, since image data of the DV system are recorded on the hard disk 41, the signal processing circuit 42 decodes the image data of the DV system into image data of, for example, the NTSC system and outputs the decoded image data from the output terminal.

The signal processing circuit 42 supplies the image data of the DV system played back from the hard disk 41 to the interface circuit 43. The interface circuit 43 transmits the image data of the DV system from the signal processing circuit 42 to the digital television monitor 32 through the IEEE 1394 cable 3.

Accordingly, here, image data compression coded in accordance with the DV system are transmitted from the hard disk recorder 31 to the digital television monitor 32 through the IEEE 1394 cable 3. It is to be noted that, although it is possible to transmit image data of the NTSC system or the like obtained by decoding image data of the DV system from the hard disk recorder 31 to the digital television monitor 32, between different IEEE 1394 apparatus, image data of the DV system are usually communicated as they are.

The image data transmitted from the hard disk recorder 31 through the IEEE 1394 cable 3 in such a manner as described above are received by the interface circuit 51 of the digital television monitor 32. The interface circuit 51 supplies the image data to the signal processing circuit 52. The signal processing circuit 52 decodes the image data of the DV system from the interface circuit 51 into image data of, for example, the NTSC system and supplies the resulting image data to the display 53 so that the image data are displayed on the display 53.

Then, if the user operates, for example, the button (fast feed button) of the operation panel 45 for inputting an instruction for fast feeding, then the operation panel 45 supplies an operation signal for a fast feed instruction to the control circuit 44. In this instance, the control circuit 44 sets the operation mode of the apparatus to a fast feed mode.

After the fast feed mode is entered, the signal processing circuit 42 plays back the image data for each N frames.

While image data compression coded in accordance with the DV system are recorded on the hard disk 41, the data amount per one frame in the DV system is known and the data of the DV system include only intra-coded images without involving interframe coding, it is possible to play back image data of the DV system for each plurality of frames. It is to be noted that it is otherwise possible to record image data compression coded in accordance with a system which involves interframe coding such as, for example, the MPEG system on the hard disk 41. In this instance, for detection of image data of a predetermined frame, a method disclosed in Japanese Patent Laid-Open No. Hei 6-325553 or No. Hei 11-312381 filed for patent in Japan by the assignee of the present application can be adopted.

If the signal processing circuit 42 plays back image data after each N−1 frames from the hard disk 41, then N-fold speed playback is performed.

The signal processing circuit 42 supplies the image data played back from the hard disk 41 to the interface circuit 43. The image data are thereafter transmitted to the digital television monitor 32 in a similar manner to that in the normal playback.

The digital television monitor 32 controls the display 53 to display the image data from the hard disk recorder 31 in a similar manner to that in the normal playback described hereinabove. It is to be noted that, since the image data transmitted thereto from the hard disk recorder 31 in this instance are data of frames at intervals of N frames, moving pictures in a fast fed state are displayed on the display 53.

Then, if the user operates, for example, the button (pause button) of the operation panel 45 for inputting a pause instruction, then the operation panel 45 supplies an operation signal for a pause instruction to the control circuit 44. In this instance, the control circuit 44 sets the operation mode of the apparatus to a pause mode.

After the pause mode is entered, the signal processing circuit 42 supplies image data of the same frame obtained by repetitively playing back a frame of the image data, which has been played back last from the hard disk 41, from the hard disk 41 to the interface circuit 43. The interface circuit 43 transmits the image data from the signal processing circuit 42 to the digital television monitor 32 and also to the display 14 so that the image data are displayed through the IEEE 1394 cable 3.

The digital television monitor 32 controls the display 53 to display the image data from the hard disk recorder 31 in a similar manner as in the normal playback. In this instance, the image data transmitted from the hard disk recorder 31 are data of the same frame as described above, and therefore, moving pictures of a pause state are displayed on the display 53.

As described above, in the AV systems described above, even if a pause instruction is issued, image data of the same frame are transmitted repetitively through the IEEE 1394 cable 3. In other words, also when a pause mode is established, image data are transmitted occupying a transmission bandwidth similar to that in normal playback. More particularly, where the image data to be transmitted are data, for example, of the NTSC system, they are transmitted occupying a transmission bandwidth corresponding to 29.97 frames/sec.

Accordingly, although there is no problem if the communication through the IEEE 1394 cable 3 is used only for transmission of the image data, if it is used also for delivery of data by another application, a limited transmission bandwidth is used by transmission of image data of the same frame and the delivery of data by another application is limited. Thus, the transmission bandwidth is not utilized efficiently.

SUMMARY OF THE INVENTION

It is an object of the present invention to provide an image processing apparatus and an image processing method as well as a recording medium by which efficient communication can be achieved.

In order to attain the object described above, according to an aspect of the present invention, there is provided an image processing apparatus, comprising a playback section for playing back image data, a transmission section for transmitting the played back image data to a reception apparatus through a predetermined transmission line, and a control section for controlling, when an instruction to temporarily stop the playback of the image data is received, the playback section and the transmission section to stop the playback and the transmission of the image data, respectively, and further controlling the transmission section to transmit a message representing that the playback of the image data is temporarily stopped to the reception apparatus through the transmission line.

According to another aspect of the present invention, there is provided an image processing method, comprising a playback step of playing back image data, a transmission step of transmitting the played back image data to a reception apparatus through a predetermined transmission line, a control step of stopping, when an instruction to temporarily stop the playback of the image data is issued, the playback of the image data by the playback step and the transmission of the image data by the image transmission step, and a message transmission step of transmitting a message representing that the playback of the image data is temporarily stopped to the reception apparatus through the transmission line.

According to a further aspect of the present invention, there is provided a recording medium on which a program to be executed by a computer is recorded, the program comprising a playback step of playing back image data, a transmission step of transmitting the played back image data to a reception apparatus through a predetermined transmission line, a control step of stopping, when an instruction to temporarily stop the playback of the image data is issued, the playback of the image data by the playback step and the transmission of the image data by the image transmission step, and a message transmission step of transmitting a message representing that the playback of the image data is temporarily stopped to the reception apparatus through the transmission line.

With the image processing apparatus and the image processing method as well as the recording medium, image data are played back and transmitted to the reception apparatus through the predetermined transmission line. Then, when an instruction to temporarily stop playback of the image data is issued, the playback and the transmission of the image data are stopped, and a message representing that the playback of the image data is temporarily stopped is transmitted to the reception apparatus through the predetermined transmission line. Accordingly, efficient communication can be achieved.

According to a still further aspect of the present invention, there is provided an image processing apparatus, comprising a reception section for receiving image data transmitted thereto from a transmission apparatus through a predetermined transmission line, a storage section having a storage capacity at least for one screen for storing the image data received by the reception section, and a control section for controlling a display apparatus to display the image data received by the reception section and controlling, when a message representing that playback of the image data is temporarily stopped is received through the transmission line, the display apparatus to repetitively display the image data stored in the storage section.

According to a yet further aspect of the present invention, there is provided an image processing method, comprising a reception step of receiving image data transmitted thereto from a transmission apparatus through a predetermined transmission line, a storage step of storing the image data received by the reception step, a control step of controlling a display apparatus to display the image data received by the reception step and controlling, when a message representing that playback of the image data is temporarily stopped is received through the transmission line, the display apparatus to repetitively display the image data stored by the storage step.

According to a yet further aspect of the present invention, there is provided a recording medium on which a program to be executed by a computer is recorded, the program comprising a reception step of receiving image data transmitted thereto from a transmission apparatus through a predetermined transmission line, a storage step of storing the image data received by the reception step, a control step of controlling a display apparatus to display the image data received by the reception step and controlling, when a message representing that playback of the image data is temporarily stopped is received through the transmission line, the display apparatus to repetitively display the image data stored by the storage step.

With the image processing apparatus and the image processing method as well as the recording medium, image data transmitted from the transmission apparatus through the predetermined transmission line is received, and the received image data are stored into the storage section and displayed on the display unit. Then, if a message representing that playback of the image data is temporarily stopped is received through the transmission line, an image of the image data stored in the storage section is repetitively displayed on the display apparatus. Accordingly, efficient communication can be achieved.

According to a yet further aspect of the present invention, there is provided an image processing apparatus, comprising a transmission apparatus for playing back image data and transmitting the image data through a predetermined transmission line, and a reception apparatus for receiving the image data transmitted thereto from the transmission apparatus through the transmission line, the transmission apparatus including a playback section for playing back image data, a transmission section for transmitting the played back image data to the reception apparatus through the predetermined transmission line, and a control section for controlling, when an instruction to temporarily stop the playback of the image data is received, the playback section and the transmission section to stop the playback and the transmission of the image data, respectively, and further controlling the transmission section to transmit a message representing that the playback of the image data is temporarily stopped to the reception apparatus through the transmission line, the reception apparatus including a reception section for receiving the image data transmitted thereto from the transmission apparatus through the predetermined transmission line, a storage section having a storage capacity at least for one screen for storing the image data received by the reception section, and a control section for controlling a display apparatus to display the image data received by the reception section and controlling, when a message representing that playback of the image data is temporarily stopped is received through the transmission line, the display apparatus to repetitively display the image data stored in the storage section.

With the image processing apparatus, the transmission apparatus plays back image data and transmits the image data to the reception apparatus through the predetermined transmission line. Then, when an instruction to temporarily stop the playback of the image data is received, the playback and the transmission of the image data are stopped, and a message representing that the playback of the image data is temporarily stopped is transmitted to the reception apparatus through the transmission line. Meanwhile, the reception apparatus receives the image data transmitted from the transmission apparatus through the transmission line, and stores the received image data into the storage section and displays the image data on the display apparatus. Then, when the instruction to temporarily stop the playback of the image data is received through the transmission line, an image of the image data stored in the storage section is repetitively displayed on the display section. Accordingly, efficient communication can be achieved.

According to a yet further aspect of the present invention, there is provided an image processing apparatus, comprising a playback section for playing back image data, a transmission section for transmitting the played back image data to a reception apparatus through a predetermined network, and a control section for controlling, when a message representing that an instruction to temporarily stop the playback of the image data is issued is received through the network, the transmission section to stop the transmission of the image data.

According to a yet further aspect of the present invention, there is provided an image processing method, comprising a playback step of playing back image data, a transmission step of transmitting the played back image data to a reception apparatus through a predetermined network, and a control step of stopping, when a message representing that an instruction to temporarily stop the playback of the image data is issued is received through the network, the transmission of the image data by the transmission step.

According to a yet further aspect of the present invention, there is provided a recording medium on which a program to be executed by a computer is recorded, the program comprising a playback step of playing back image data, a transmission step of transmitting the played back image data to a reception apparatus through a predetermined network, and a control step of stopping, when a message representing that an instruction to temporarily stop the playback of the image data is issued is received through the network, the transmission of the image data by the transmission step.

With the image processing apparatus and the image processing method as well as the recording medium, image data are played back and transmitted to the reception apparatus through the predetermined network. Then, when a message representing that an instruction to temporarily stop the playback of the image data is issued is received through the network, the transmission of the image data is stopped. Accordingly, efficient communication can be achieved.

According to a yet further aspect of the present invention, there is provided an image processing apparatus, comprising a reception section for receiving image data transmitted thereto from a transmission apparatus through a predetermined network, a storage section having a storage capacity at least for one screen for storing the image data received by the reception section, a display apparatus for displaying the image data received by the reception section, a transmission section for transmitting, when an instruction to temporarily stop the playback of the image data is received, a message representing the reception of the instruction to the transmission apparatus through the network, and a display control section for controlling, when the instruction to temporarily stop the playback of the image data is received, the display apparatus to display the image data stored in the storage section.

According to a yet further aspect of the present invention, there is provided an image processing method, comprising a reception step of receiving image data transmitted thereto from a transmission apparatus through a predetermined network, a storage step of storing the image data received by the reception step into a storage section having a storage capacity at least for one screen, a display step of displaying the image data received by the reception step on a display apparatus, a transmission step of transmitting, when an instruction to temporarily stop the playback of the image data is received, a message representing the reception of the instruction to the transmission apparatus through the network, and a display control step of controlling, when the instruction to temporarily stop the playback of the image data is received, the display apparatus to display the image data stored in the storage section.

According to a yet further aspect of the present invention, there is provided a recording medium on which a program to be executed by a computer is recorded, the program comprising a reception step of receiving image data transmitted thereto from a transmission apparatus through a predetermined network, a storage step of storing the image data received by the reception step into a storage section having a storage capacity at least for one screen, a display step of displaying the image data received by the reception step on a display apparatus, a transmission step of transmitting, when an instruction to temporarily stop the playback of the image data is received, a message representing the reception of the instruction to the transmission apparatus through the network, and a display control step of controlling, when the instruction to temporarily stop the playback of the image data is received, the display apparatus to display the image data stored in the storage section.

With the image processing apparatus and the image processing method as well as the recording medium, image data transmitted from the transmission apparatus through the predetermined network is received, and the received image data are stored into the storage section and displayed on the display apparatus. Then, when an instruction to temporarily stop the playback of the image data is received, a message representing this is transmitted to the transmission apparatus through the network, and an image of the image data stored in the storage section is repetitively displayed on the display apparatus. Accordingly, efficient communication can be achieved.

According to a yet further aspect of the present invention, there is provided an image processing apparatus, comprising a transmission apparatus for playing back image data and transmitting the image data through a predetermined network, and a reception apparatus for receiving the image data transmitted thereto from the transmission apparatus through the network, the transmission apparatus including a playback section for playing back image data, a transmission section for transmitting the played back image data to the reception apparatus through the predetermined network, and a control section for controlling, when a message representing that an instruction to temporarily stop the playback of the image data is issued is received through the network, the transmission section to stop the transmission of the image data, the reception apparatus including a reception section for receiving the image data transmitted thereto from the transmission apparatus through the predetermined network, a storage section having a storage capacity at least for one screen for storing the image data received by the reception section, a display section for displaying the image data received by the reception section, a transmission section for transmitting, when an instruction to temporarily stop the playback of the image data is received, a message representing the reception of the instruction to the transmission apparatus through the network, and a display control section for controlling, when the instruction to temporarily stop the playback of the image data is received, the display apparatus to display the image data stored in the storage section.

With the image processing apparatus, the transmission apparatus plays back image data and transmits the image data to the reception apparatus through the predetermined network. Then, when a message representing that an instruction to temporarily stop the playback of the image data is issued is received through the network, the transmission of the image data is stopped. Meanwhile, the reception apparatus receives the image data transmitted from the transmission apparatus through the predetermined network, and stores the received image data into the storage section and displays the image data on the display apparatus. Then, when an instruction to temporarily stop the playback of the image data is received, a message representing this is transmitted to the transmission apparatus through the network, and an image of the image data stored in the storage section is repetitively displayed on the display apparatus. Accordingly, efficient communication can be achieved.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 8 is a block diagram showing an example of configuration of another AV system to which the present invention is applied;

FIG. 9 is a block diagram showing an example of configuration of a further AV system to which the present invention is applied;

FIGS. 10A and 10B are flow charts illustrating a playback mode process of the AV system of FIG. 9;

FIG. 13 is a block diagram showing an example of configuration of a yet further AV system to which the present invention is applied;

FIGS. 15A and 15B are flow charts illustrating a playback mode process of the AV system of FIG. 13;

FIG. 17 is a block diagram showing an example of configuration of an additional AV system to which the present invention is applied;

DESCRIPTION OF THE PREFERRED EMBODIMENTS

Figure 1:
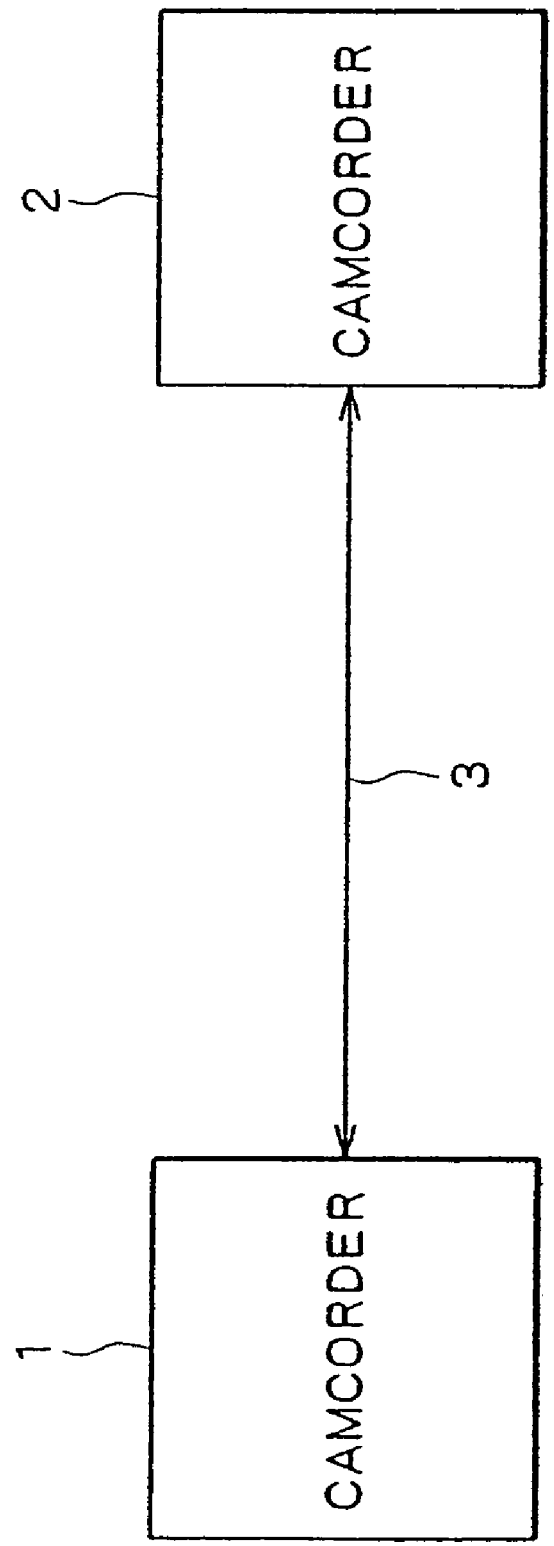
FIG. 1 is a block diagram showing a configuration of an example of related-art AV system.
Figure 2:
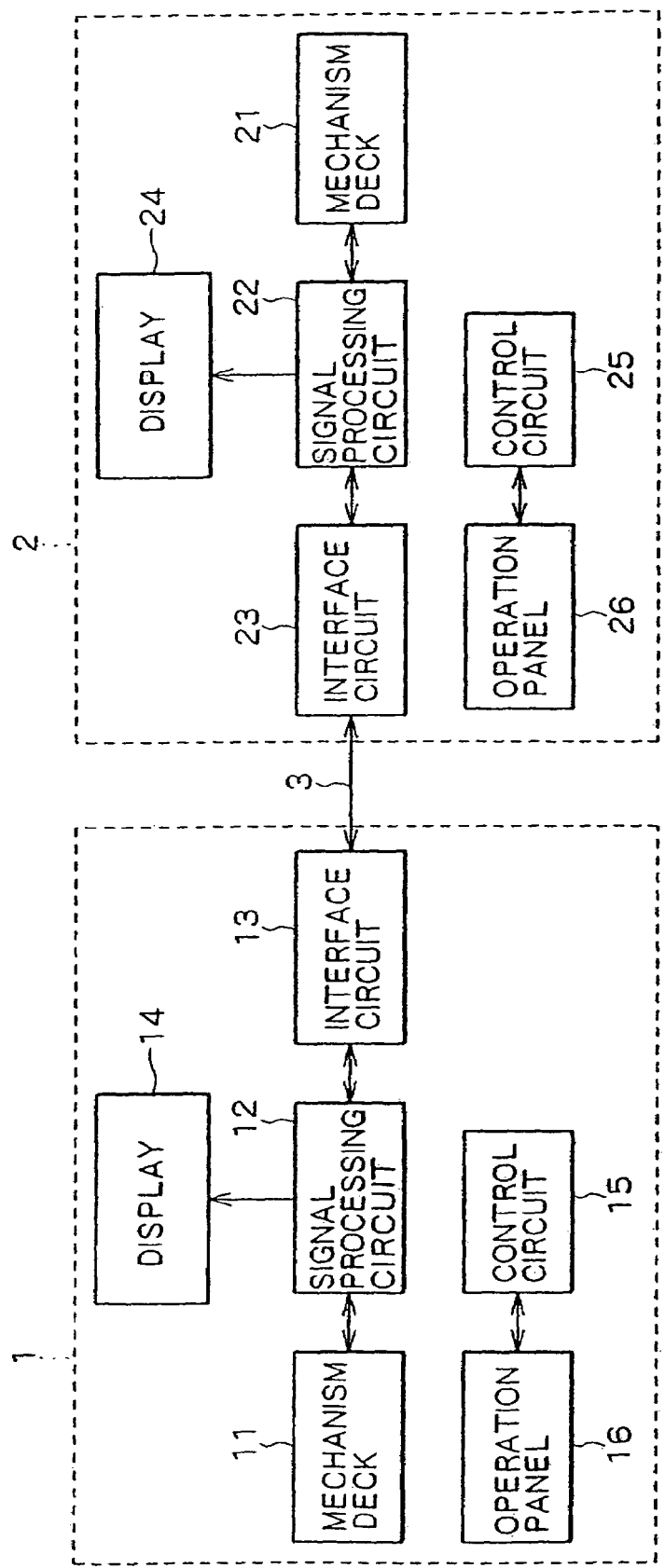
FIG. 2 is a block diagram showing an example of detailed configuration of the AV system of FIG. 1.
Figure 4:
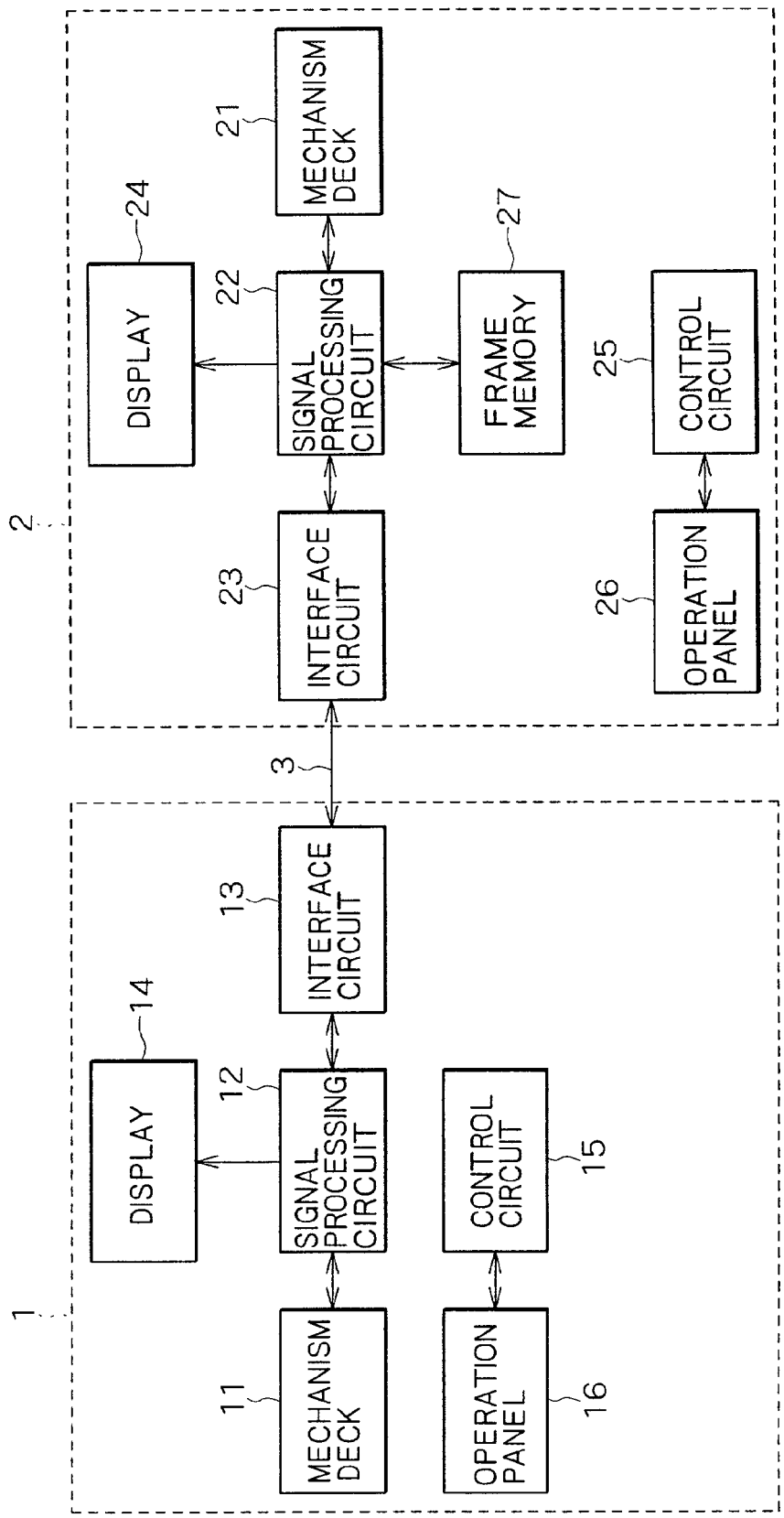
FIG. 4 is a block diagram showing an example of configuration of an AV system to which the present invention is applied.

FIG. 4 shows an example of configuration of an AV system to which the present invention is applied. It is to be noted that like elements to those of FIG. 2 are denoted by like reference numerals and overlapping description of them is omitted suitably to avoid redundancy. In particular, the AV system of FIG. 4 has a basically similar configuration to that of the AV system of FIG. 2 except that the camcorder 2 which receives and displays image data additionally includes a frame memory 27.

The frame memory 27 has a storage capacity sufficient to store image data, for example, of one frame and stores image data supplied thereto from the signal processing circuit 22.

Figure 5:
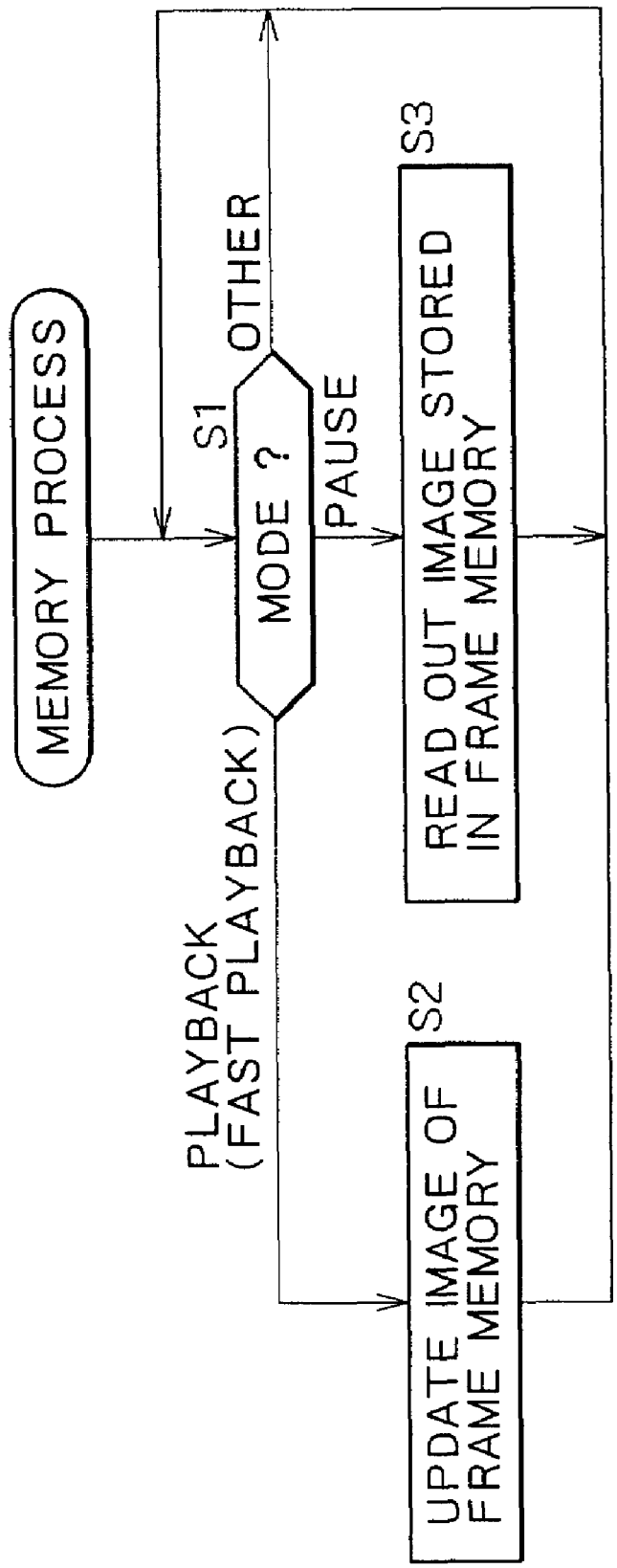
FIG. 5 is a flow chart illustrating a memory process of the AV system of FIG. 4.

The control circuit 25 of the camcorder 2 performs such a memory process as illustrated in FIG. 5 for the frame memory 27.

Referring to FIG. 5, first in step S1, the control circuit 25 discriminates the operation mode of the apparatus. If it is discriminated in step S1 that the operation mode is the playback mode, then the processing advances to step S2, in which the control circuit 25 controls the signal processing circuit 22 to store a frame of image data received by the interface circuit 23 into the frame memory 27, whereafter the processing returns to step S1 so that similar processing may be repeated.

Accordingly, when the apparatus is in the playback mode, the camcorder 2 repeats to receive image data transmitted thereto from the camcorder 1 and update the stored contents of the frame memory 27 with the received image data.

It is to be noted that, also when fast feeding such as N-fold speed playback is proceeding with the camcorder 1, the control circuit 25 repeats to update the stored contents of the frame memory 27 with a frame of image data transmitted thereto from the camcorder 1 similarly as in the case wherein normal playback is proceeding.

On the other hand, if it is discriminated in step S1 that the operation mode is the pause mode, then the processing advances to step S3, in which the control circuit 25 controls the signal processing circuit 22 to read out the image data stored in the frame memory 27 and supply the image data to the display 24, whereafter the processing returns to step S1.

Accordingly, when the apparatus is in the pause mode, (the signal processing circuit 22 of) the camcorder 2 does not perform updating of the frame memory 27 but repetitively reads out an image stored in the frame memory 27 and supplies it to the frame memory 27 so that the image is displayed on the display 24 repetitively.

Further, if it is discriminated in step S1 that the operation mode is not any one of the playback mode and the pause mode, then the processing returns to step S1 so that similar processing is repeated.

Figure 6A:
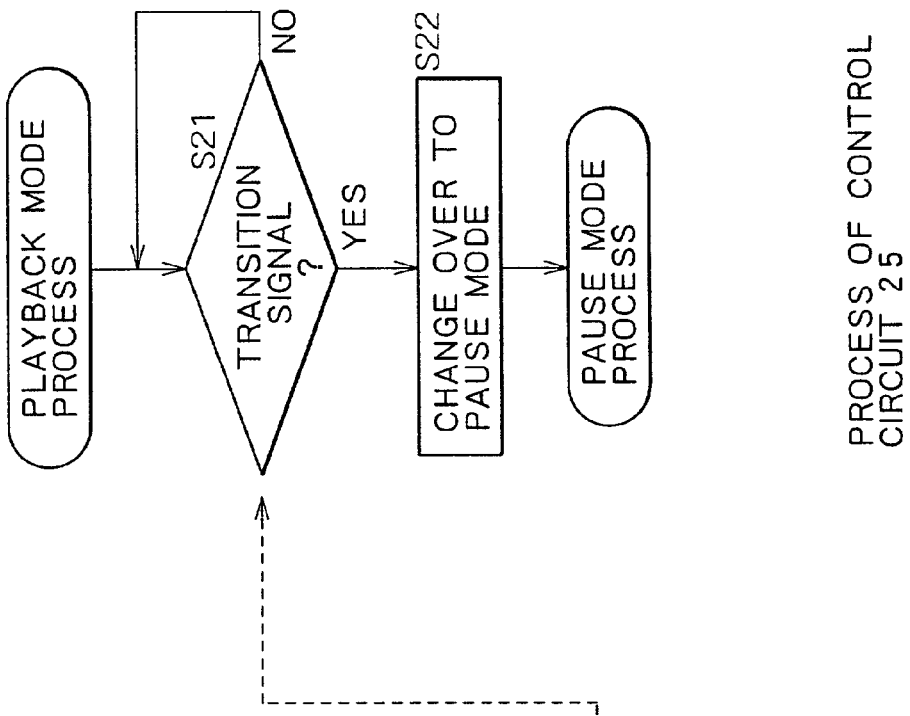
FIGS. 6A and 6B are flow charts illustrating a playback mode process of the AV system of FIG. 4.
Figure 6B:
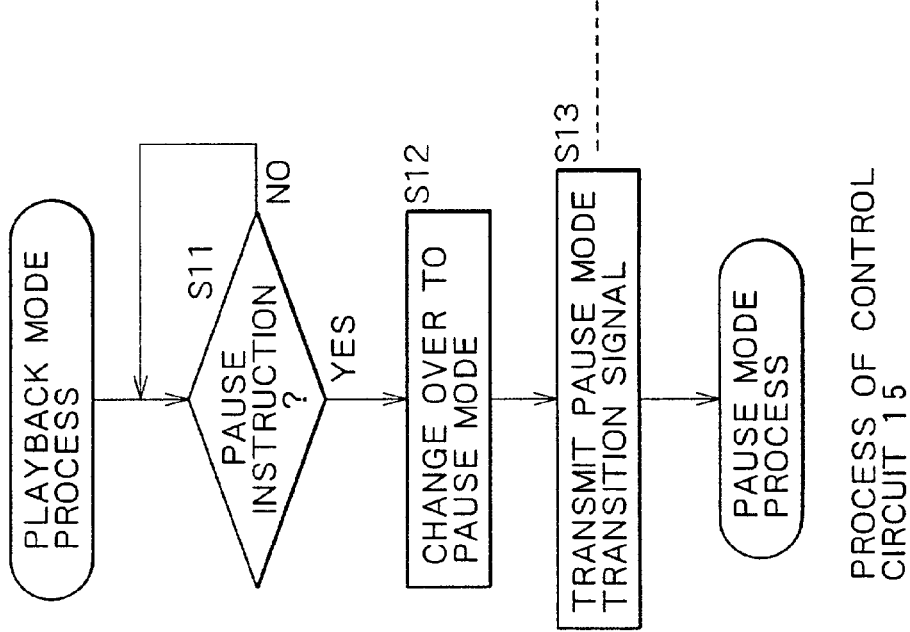

Now, processes of the control circuit 15 of the camcorder 1 and the control circuit 25 of the camcorder 2 when the operation mode is the playback mode are described with reference to FIGS. 6A and 6B.

First, a process of the control circuit 15 is described with reference to FIG. 6A.

In the playback mode, the camcorder 1 plays back image data and transmits the image data to the camcorder 2 through the IEEE 1394 cable 3 as described hereinabove with reference to FIG. 2.

Then in step S11, the control circuit 15 discriminates whether or not an operation signal for a pause instruction is supplied thereto from the operation panel 16. If the control circuit 15 discriminates that an operation signal is not supplied thereto, then the processing returns to step S11.

If the control circuit 15 discriminates in step S11 that an operation signal for a pause instruction is supplied thereto from the operation panel 16, that is, if the user operates the pause button of the operation panel 16, then the processing advances to step S12, in which the control circuit 15 changes the operation mode of the apparatus to the pause mode.

After the pause mode is entered, the mechanism deck 11 stops feeding of the video tape. As a result, the playback of the image data from the mechanism deck 11 is stopped. It is to be noted that, in order to minimize the response time when the operation mode changes over from the pause mode to the playback mode, the mechanism deck 11 stands by, for example, in a standby state (a state wherein the mechanism deck 11 can resume feeding of the video tape immediately thereby to resume playback of image data).

Further, in the pause mode, the interface circuit 13 stops transmission of image data through the IEEE 1394 cable 3.

Thereafter, the processing advances to step S13, in which the control circuit 15 controls the interface circuit 13 to transmit a pause mode transition signal as a message representing that the camcorder 1 has entered the pause mode.

Here, if the power supply to the camcorder 1 and the camcorder 2 is placed into an on state, then the interface circuit 13 of the camcorder 1 and the interface circuit 23 of the camcorder 2 recognize IEEE 1394 apparatus connected thereto by the IEEE 1394 cable 3 (in FIG. 4, the camcorders 1 and 2) and establish a cannel (logical channel) for delivery of a controlling message. Consequently, the pause mode transition signal is transmitted from the interface circuit 13 to the camcorder 2 by the channel for delivery of a controlling message.

Thereafter, the control circuit 15 of the camcorder 1 performs a pause mode process which is hereinafter described.

Now, a process of the control circuit 25 in the playback mode is described with reference to FIG. 6B.

In the playback mode, the camcorder 2 displays image data transmitted thereto from the camcorder 1 on the display 24 described hereinabove with reference to FIG. 2.

Then in step S21, the control circuit 25 discriminates whether or not a pause mode transition signal is transmitted thereto from the camcorder 1. If it is discriminated in step S21 that a pause mode transmission signal is not transmitted thereto, that is, if a pause mode transition signal is not received by the interface circuit 23, then the processing returns to step S21.

If the control circuit 25 discriminates in step S21 that a pause mode transition signal is transmitted thereto from the camcorder 1, that is, if a pause mode transition signal is received by the interface circuit 23, then the processing advances to step S22, in which the control circuit 25 changes over the operation mode of the apparatus to the pause mode. Consequently, the control circuit 25 thereafter performs a pause mode process which is hereinafter described.

As described above, when the camcorder 1 enters the pause mode, playback and transmission of image data are stopped, and no image data are transmitted from the camcorder 1 to the camcorder 2. Further, in this instance, after the camcorder 2 enters the pause mode in step S22, it repetitively reads out an image stored in the frame memory 27 and supplies the image to the display 24 so that the image is displayed on the display 24 as described hereinabove in connection with the memory process of FIG. 5. Accordingly, in the pause mode, image data of the last frame stored in the frame memory 27 are displayed on the display 24.

Since, in the pause mode, playback and transmission of an image of the camcorder 1 are stopped as described above, the transmission bandwidth for communication through the IEEE 1394 cable 3 (such communication is hereinafter referred to suitably as IEEE 1394 communication) is not used for repetitive transmission of image data of the same frame as in the prior art. Therefore, the transmission bandwidth can be utilized effectively. Further, use of the transmission bandwidth by another application is not limited at all.

Further, since the last image data stored in the frame memory 27 are repetitively read out and displayed by the camcorder 2, moving pictures of a pause state are displayed similarly as in the prior art.

Figure 7B:
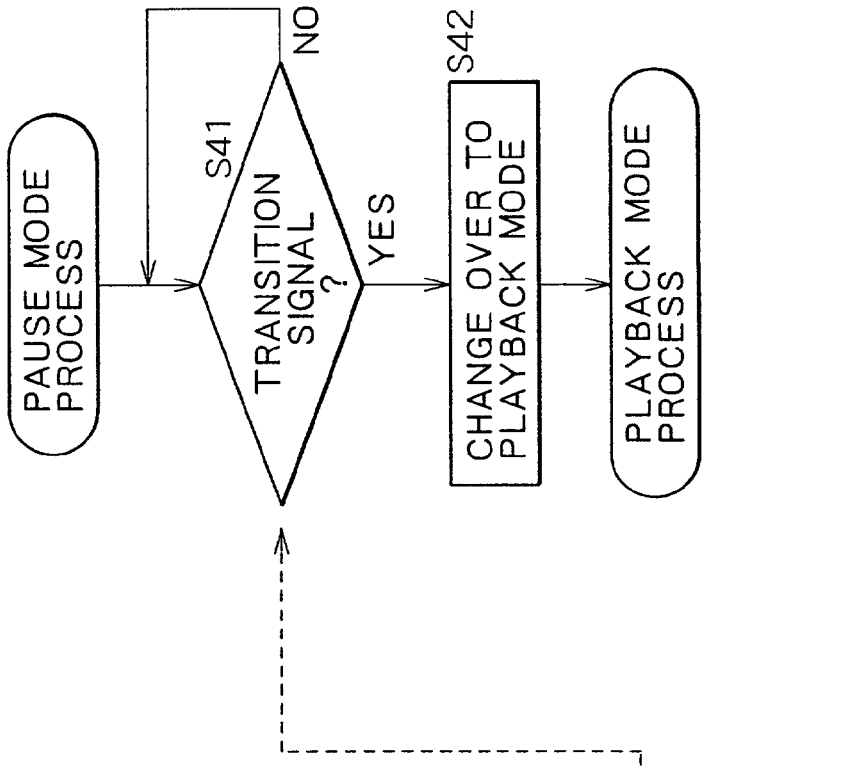
FIGS. 7A and 7B are flow charts illustrating a pause mode process of the AV system of FIG. 4.
Figure 7A:
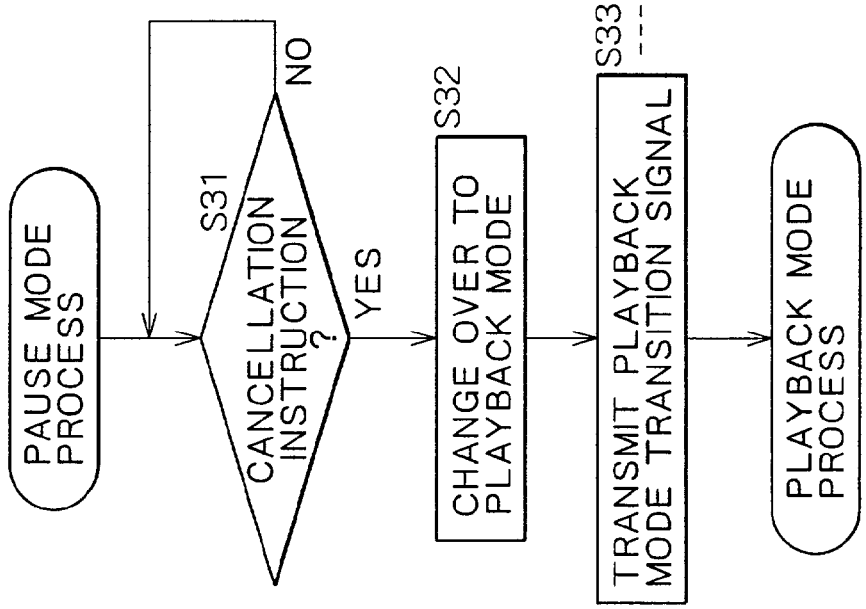

Now, processes of the control circuit 15 of the camcorder 1 and the control circuit 25 of the camcorder 2 in the pause mode are described with reference to FIGS. 7A and 7B.

First, a process of the control circuit 15 is described with reference to FIG. 7A.

In the pause mode, the camcorder 1 stops playback and transmission of image data as described with reference to FIG. 6A.

Then, the control circuit 15 supervises the operation signal from the operation panel 16 and discriminates in step S31 whether or not the user operates the operation panel 16 so as to cancel the pause. If it is discriminated in step S31 that the user does not operate the operation panel 16 so as to cancel the pause, then the processing returns to step S31.

If it is discriminated in step S31 whether or not the user operates the operation panel 16 so as to cancel the pause, then the processing advances to step S32, in which the control circuit 15 sets the operation mode of the apparatus to the playback mode. After the playback mode is entered, the mechanism deck 11 resumes feeding of the video tape. As a result, playback of succeeding image data by the mechanism deck 11 is resumed. Further, the interface circuit 13 resumes transmission of image data through the IEEE 1394 cable 3. As a result, image data played back by the mechanism deck 11 are transmitted to the camcorder 2 by the interface circuit 13.

Then, the processing advances to step S33, in which the control circuit 15 controls the interface circuit 13 to transmit a playback mode transition signal as a message representing that the camcorder 1 has entered the playback mode (that the pause has been canceled). Thereafter, the control circuit 15 performs the playback mode process described hereinabove with reference to FIG. 6A.

Now, a process of the control circuit 25 in the pause mode is described with reference to FIG. 7B.

As described hereinabove, in the pause mode, the camcorder 2 repetitively reads out and displays the last image data stored in the frame memory 27.

Then, the control circuit 25 supervises the channel of the IEEE 1394 cable 3 for delivery of a controlling message and discriminates in step S41 whether or not a playback mode transition signal is transmitted thereto from the camcorder 1.

If it is discriminated in step S41 that a playback mode transition signal is not transmitted from the camcorder 1, that is, if a playback mode transition signal is not received by the interface circuit 23 of the camcorder 2, then the processing returns to step S41.

If the control circuit 25 discriminates in step S41 that a playback mode transition signal is transmitted thereto from the camcorder 1, that is, if a playback mode transition signal is received by the interface circuit 23 of the camcorder 2, then the processing advances to step S42, in which the control circuit 25 changes over the operation mode of the apparatus to the playback mode. Thereafter, the control circuit 25 performs the playback mode process described hereinabove with reference to FIG. 6B.

After the camcorder 1 enters the playback mode as described above, playback and transmission of image data are resumed, and image data are transmitted from the camcorder 1 to the camcorder 2. Further, in this instance, after the camcorder 2 enters the playback mode in step S42, it updates the stored contents of the frame memory 27 with image data transmitted thereto from the camcorder 1 as described in connection with the memory process of FIG. 5. Further, the camcorder 2 supplies the image data transmitted thereto from the camcorder 1 to the display 24 so that the image data are displayed on the display 24.

FIG. 8 shows an example of configuration of another AV system to which the present invention is applied. It is to be noted that, in FIG. 8, like elements to those of FIG. 4 are denoted by like reference numerals and description of them is suitably omitted herein to avoid redundancy. In particular, the AV system of FIG. 8 has a configuration similar to that of FIG. 4 except that it includes, in addition to the camcorder 2, two camcorders 61 and 62 as camcorders which receive and display image data from the camcorder 1.

Both of the camcorders 61 and 62 are configured similarly to the camcorder 2. To the camcorders 61 and 62, data same as those transmitted to the camcorder 2 are transmitted from the camcorder 1 through the IEEE 1394 cable 3.

Accordingly, the camcorders 61 and 62 display image data transmitted thereto from the camcorder 1 in a similar manner to that of the camcorder 2.

Thus, the present invention can be applied not only to an AV system wherein image data are transmitted from one camcorder (such as the camcorder 1) to another one camcorder (such as the camcorder 2) but also to another AV system wherein image data are transmitted from one camcorder (such as the camcorder 1) to a plurality of camcorders (such as the three camcorders 2, 61 and 62). In short, the present invention can be applied not only to a one to one communication form (topology) but also to a one to multiple communication form such as broadcasting.

Figure 3:
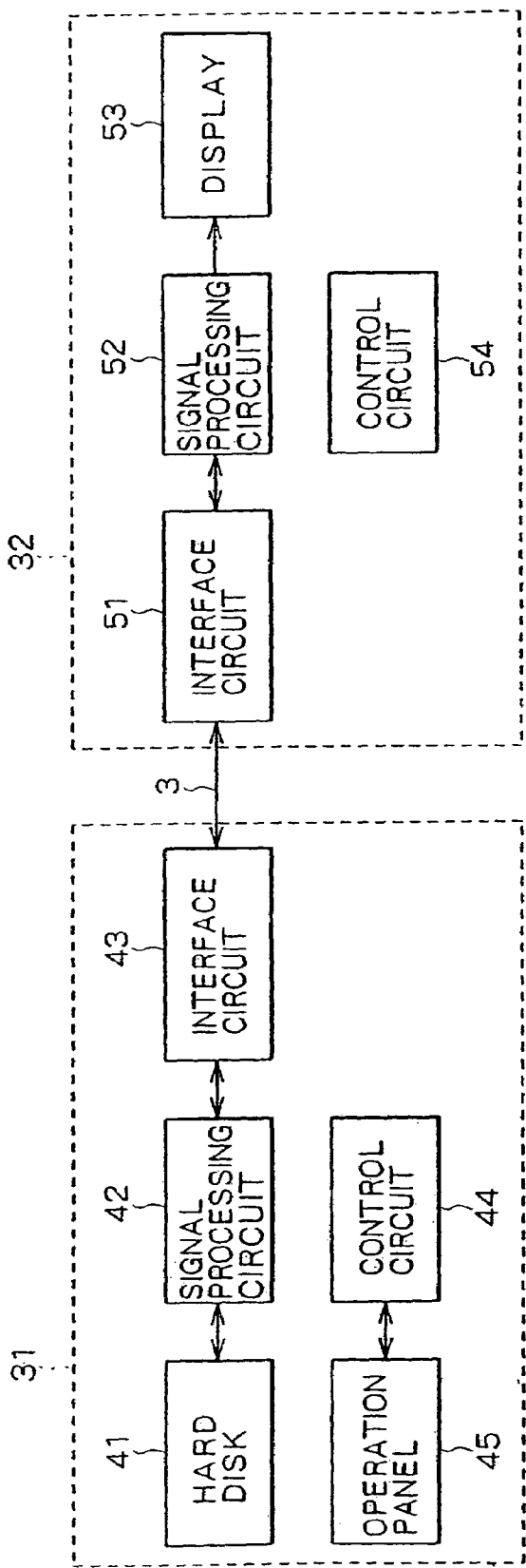
FIG. 3 is a block diagram showing another example of detailed configuration of the AV system of FIG. 1.

FIG. 9 shows an example of configuration of a further AV system to which the present invention is applied. It is to be noted that, in FIG. 9, like elements to those of FIG. 3 are denoted by like reference numerals and description of them is suitably omitted herein to avoid redundancy. In particular, the AV system of FIG. 9 has a basically similar configuration to that of FIG. 3 except that the digital television monitor 32 for receiving and displaying image data additionally includes a frame memory 55.

The frame memory 55 is similar to the frame memory 27 of FIG. 4 and stores image data supplied thereto from the signal processing circuit 52.

The signal processing circuit 52 of the digital television monitor 32 performs such a memory process as illustrated in FIG. 5 for the frame memory 55 similarly to the control circuit 25 of the camcorder 2 of FIG. 4.

Accordingly, in the playback mode, stored contents of the frame memory 55 are updated with image data transmitted thereto from the hard disk recorder 31. On the other hand, in the pause mode, updating of the frame memory 55 is not performed, but an image stored in the frame memory 55 is repetitively read out and supplied to the display 53 so that it is displayed on the display 53.

Now, processes of the control circuit 44 of the hard disk recorder 31 and the control circuit 54 of the digital television monitor 32 in the playback mode are described with reference to FIGS. 10A and 10B.

First, a process of the control circuit 44 is described with reference to FIG. 10A.

In the playback mode, the hard disk recorder 31 plays back image data and transmits the image data to the digital television monitor 32 through the IEEE 1394 cable 3 as described hereinabove with reference to FIG. 3.

Then in step S51, the control circuit 44 discriminates whether or not an operation signal for a pause instruction is supplied thereto from the operation panel 45. If the control circuit 44 discriminates that an operation signal is not supplied, then the processing returns to step S51.

If the control circuit 44 discriminates in step S51 that an operation signal for a pause instruction is supplied thereto from the operation panel 45, that is, if the user operates the pause button of the operation panel 45, then the processing advances to step S52, in which the control circuit 44 changes over the operation mode of the apparatus to the pause mode.

After the pause mode is entered, the signal processing circuit 42 stops the playback of the image data from the hard disk 41, and the interface circuit 43 stops the transmission of image data through the IEEE 1394 cable 3. It is to be noted that, in order to make it possible to resume playback immediately from a frame next to a frame of the image data which has been played back last from the hard disk 41, the signal processing circuit 42 places the hard disk 41 into a standby state.

Thereafter, the processing advances to step S53, in which the control circuit 44 controls the interface circuit 43 to transmit a pause mode transition signal as a message representing that the hard disk recorder 31 has entered the pause mode.

Here, in the AV system of FIG. 9, if the power supply to the hard disk recorder 31 and the digital television monitor 32 is placed into an on state, then the interface circuit 43 of the hard disk recorder 31 and the interface circuit 51 of the digital television monitor 32 recognize IEEE 1394 apparatus connected thereto by the IEEE 1394 cable 3 (in FIG. 9, the hard disk recorder 31 and the digital television monitor 32) and establish a cannel for delivery of a controlling message. Consequently, the pause mode transition signal is transmitted from the interface circuit 43 to the digital television monitor 32 by the channel for delivery of a controlling message.

Thereafter, the control circuit 44 of the hard disk recorder 31 performs a pause mode process which is hereinafter described.

Now, a process of the control circuit 54 in the playback mode is described with reference to FIG. 10B.

In the playback mode, the digital television monitor 32 displays image data transmitted thereto from the hard disk recorder 31 on the display 53 described hereinabove with reference to FIG. 3.

Then in step S61, the control circuit 54 discriminates whether or not a pause mode transition signal is transmitted thereto from the hard disk recorder 31. If it is discriminated in step S61 that a pause mode transmission signal is not transmitted thereto, that is, if a pause mode transition signal is not received by the interface circuit 51 of the digital television monitor 32, then the processing returns to step S61.

If the control circuit 54 discriminates in step S61 that a pause mode transition signal is transmitted thereto from the hard disk recorder 31, that is, if a pause mode transition signal from the hard disk recorder 31 is received by the interface circuit 51, then the processing advances to step S62, in which the control circuit 54 changes over the operation mode of the apparatus to the pause mode. Consequently, the control circuit 54 thereafter performs a pause mode process which is hereinafter described.

As described above, when the hard disk recorder 31 enters the pause mode, playback and transmission of image data are stopped, and no image data are transmitted from the hard disk recorder 31 to the digital television monitor 32. Further, in this instance, after the digital television monitor 32 enters the pause mode in step S62, it repetitively reads out an image stored in the frame memory 55 and supplies the image to the display 53 so that the image is displayed on the display 53 as described hereinabove in connection with the memory process of FIG. 5. Accordingly, in the pause mode, image data of the last frame stored in the frame memory 55 are displayed on the display 53.

Since, in the pause mode, playback and transmission of an image by the hard disk recorder 31 are stopped as described above, the transmission bandwidth for IEEE 1394 communication is not used for repetitive transmission of image data of the same frame as in the prior art. Therefore, the transmission bandwidth can be utilized effectively. Further, use of the transmission bandwidth by another application is not limited at all.

Furthermore, since the last image data stored in the frame memory 55 are repetitively read out and displayed by the digital television monitor 32, moving pictures of a pause state are displayed similarly as in the prior art.

Figure 11B:
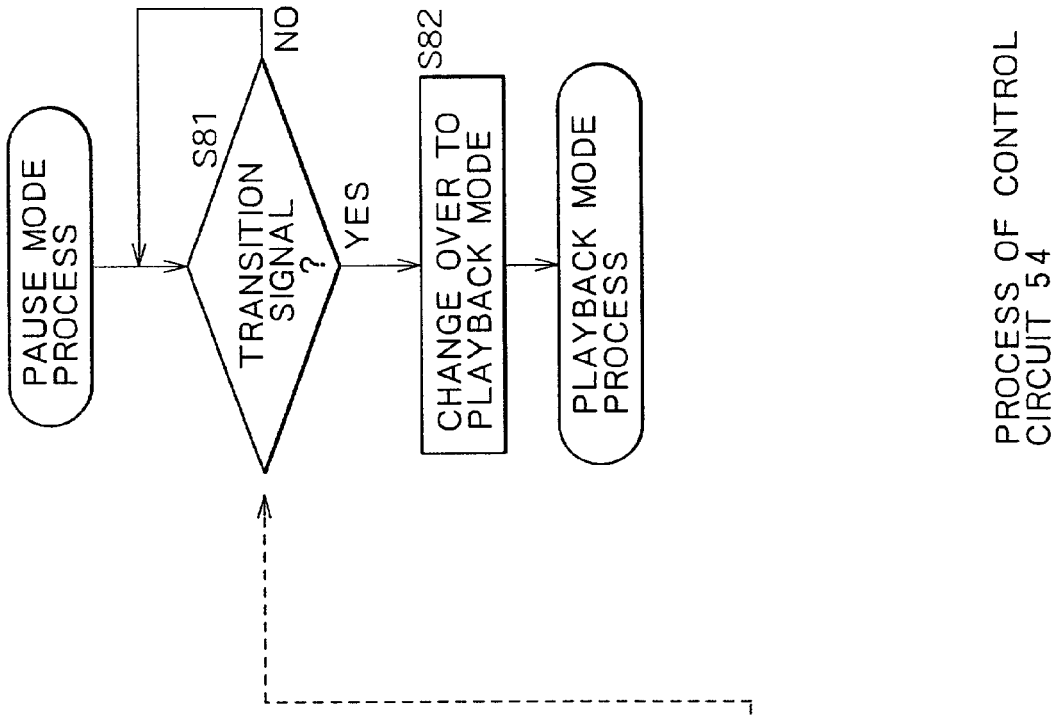
FIGS. 11A and 11B are flow charts illustrating a pause mode process of the AV system of FIG. 9.
Figure 11A:
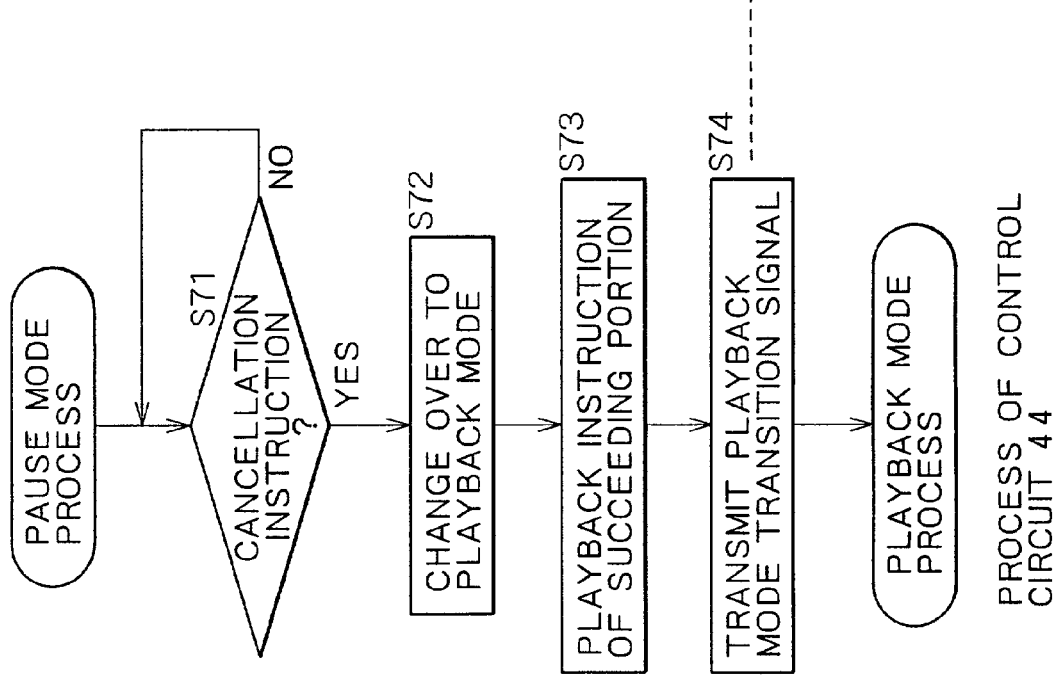

Now, processes of the control circuit 44 of the hard disk recorder 31 and the control circuit 54 of the digital television monitor 32 in the pause mode are described with reference to FIGS. 11A and 11B.

First, a process of the control circuit 44 is described with reference to FIG. 11A.

In the pause mode, the hard disk recorder 31 stops playback and transmission of image data as described with reference to FIG. 10A.

Then, the control circuit 44 supervises the operation signal from the operation panel 45 and discriminates in step S71 whether or not the user operates the operation panel 45 so as to cancel the pause. If it is discriminated in step S71 that the user does not operate the operation panel 45 so as to cancel the pause, then the processing returns to step S71.

If it is discriminated in step S71 that the user operates the operation panel 45 so as to cancel the pause, then the processing advances to step S72, in which the control circuit 44 sets the operation mode of the apparatus to the playback mode. After the playback mode is entered, the signal processing circuit 42 controls the hard disk 41 in step S73 so that the playback is resumed from a frame next to a frame of the image data which has been played back immediately before the pause mode is entered. Further, the interface circuit 43 resumes transmission of image data through the IEEE 1394 cable 3. As a result, image data played back from the hard disk 41 are transmitted to the digital television monitor 32 by the interface circuit 43.

Then, the processing advances to step S74, in which the control circuit 44 controls the interface circuit 43 to transmit a playback mode transition signal as a message representing that the hard disk recorder 31 has entered the playback mode. Thereafter, the control circuit 44 performs the playback mode process described hereinabove with reference to FIG. 10A.

Now, a process of the control circuit 54 in the pause mode is described with reference to FIG. 11B.

As described hereinabove, in the pause mode, the digital television monitor 32 repetitively reads out and displays the last image data stored in the frame memory 55.

Then, the control circuit 54 supervises the channel of the IEEE 1394 cable 3 for delivery of a controlling message and discriminates in step S81 whether or not a playback mode transition signal is transmitted thereto from the hard disk recorder 31.

If it is discriminated in step S81 that a playback mode transition signal is not transmitted from the hard disk recorder 31, that is, if a playback mode transition signal is not received by the interface circuit 51 of the digital television monitor 32, then the processing returns to step S81.

If the control circuit 54 discriminates in step S81 that a playback mode transition signal is transmitted thereto from the hard disk recorder 31, that is, if a playback mode transition signal from the hard disk recorder 31 is received by the interface circuit 51, then the processing advances to step S82, in which the control circuit 54 changes over the operation mode of the apparatus to the playback mode. Thereafter, the control circuit 54 performs the playback mode process described hereinabove with reference to FIG. 10B.

After the hard disk recorder 31 enters the playback mode as described above, playback and transmission of image data are resumed, and image data are transmitted from the hard disk recorder 31 to the digital television monitor 32. Further, in this instance, after the digital television monitor 32 enters the playback mode in step S82, it updates the stored contents of the frame memory 55 with image data transmitted thereto from the hard disk recorder 31 as described hereinabove in connection with the memory process of FIG. 5. Further, the digital television monitor 32 supplies the image data transmitted thereto from the hard disk recorder 31 to the display 53 so that the image data are displayed on the display 53.

It is to be noted that the hard disk recorder 31 of FIG. 9 may additionally include a frame buffer between the hard disk 41 and the signal processing circuit 42 such that image data played back from the hard disk 41 may be stored once into the frame buffer. In this instance, if image data of the same frame are required repetitively, then the image data are not read out from the hard disk 41 repetitively, but read out from the frame buffer.

Figure 12:
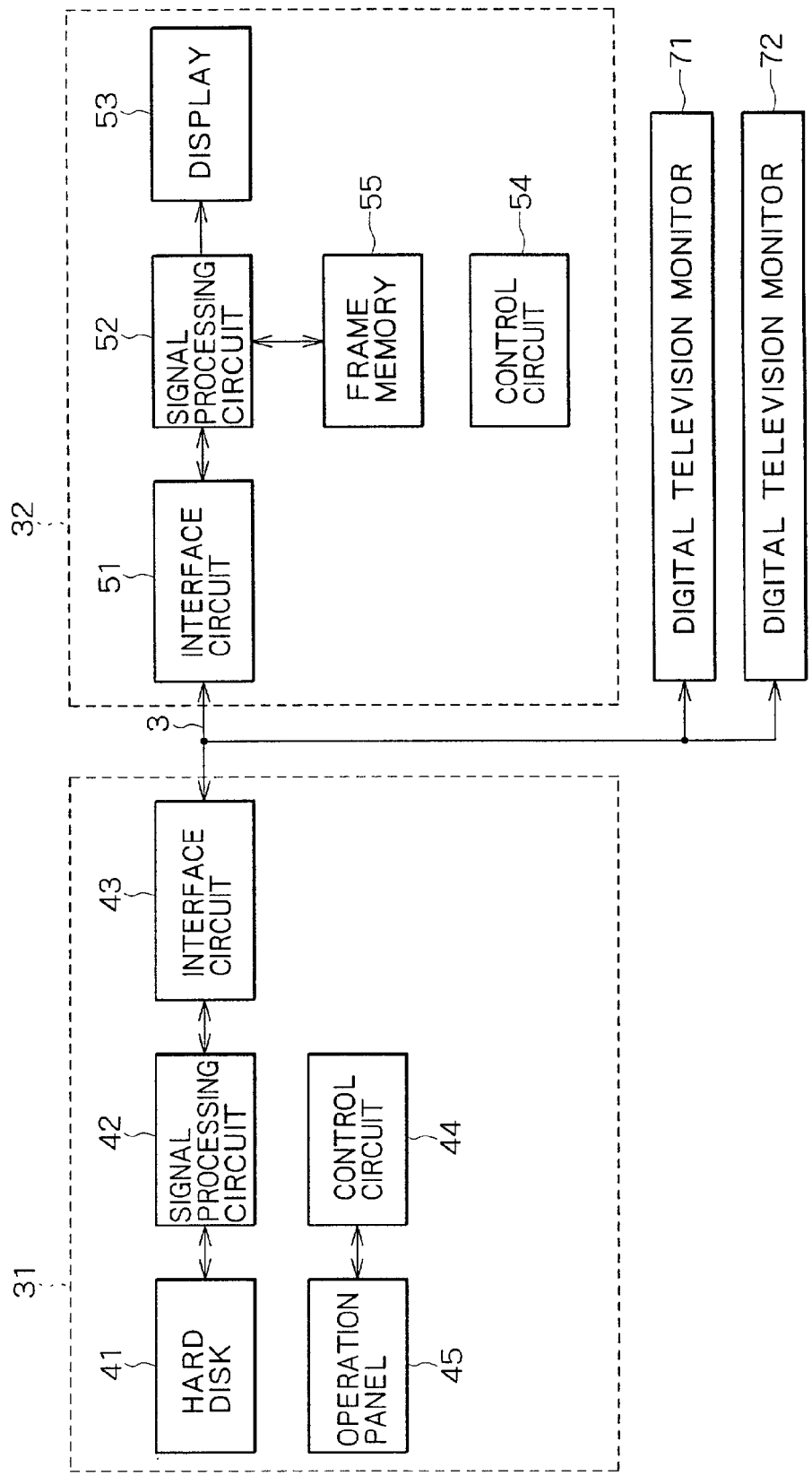
FIG. 12 is a block diagram showing an example of configuration of a still further AV system to which the present invention is applied.

FIG. 12 shows an example of configuration of a still further AV system to which the present invention is applied. It is to be noted that, in FIG. 12, like elements to those of FIG. 9 are denoted by like reference numerals and description of them is suitably omitted herein to avoid redundancy. In particular, the AV system of FIG. 12 has a configuration similar to that of FIG. 9 except that it includes, in addition to the digital television monitor 32, two digital television monitors 71 and 72 as digital television monitors which receive and display image data from the hard disk recorder 31.

Both of the digital television monitors 71 and 72 are configured similarly to the digital television monitor 32. To the digital television monitors 71 and 72, data same as data transmitted to the digital television monitor 32 are transmitted from the hard disk recorder 31 through the IEEE 1394 cable 3.

Accordingly, the digital television monitors 71 and 72 display image data transmitted thereto from the hard disk recorder 31 in a similar manner to that of the digital television monitor 32.

In this manner, where the present invention is applied to an AV system which is formed from a hard disk recorder and a digital television monitor, it can be applied not only to a one-to-one communication form but also to a one-to-multiplicity communication form such as broadcasting.

FIG. 13 shows an example of configuration of a yet further AV system to which the present invention is applied. It is to be noted that, in FIG. 13, like elements to those of FIG. 9 are denoted by like reference numerals and description of them is suitably omitted herein to avoid redundancy. In particular, the AV system of FIG. 13 has a basically similar configuration to that of FIG. 9 except that the hard disk recorder 31 does not include the operation panel 45, but instead, the digital television monitor 32 additionally includes an operation panel 56.

In the AV system of FIG. 9, transmission/reception of image data of the push type wherein, when the user operates the operation panel 45 of the hard disk recorder 31 of the transmission side from which image data are transmitted, image data are transmitted to the digital television monitor 32 of the reception side which receives image data, is performed as described above. In the AV system of FIG. 13, however, transmission/reception of image data of the pull type wherein when the operation panel 56 of the digital television monitor 32 of the reception side is operated by the user, a request for transmission of image data or the like is issued to the hard disk recorder 31 of the transmission side, and in response to the request, transmission of image data or the like is performed, is performed.

Now, processes of the control circuit 54 of the digital television monitor 32 and the control circuit 44 of the hard disk recorder 31 in FIG. 13 when the operation mode changes over from a stop mode in which the apparatus is nonoperating to the playback mode are described with reference to FIGS. 14A and 14B.

First, a process of the control circuit 54 of the digital television monitor 32 is described with reference to FIG. 14A.

In the playback mode, the digital television monitor 32 does not particularly perform any process, and in step S91, the control circuit 54 discriminates whether or not an operation signal for a playback instruction is supplied thereto from the operation panel 56. If the control circuit 54 discriminates that an operation signal for a playback instruction is not supplied, then the processing returns to step S91.

If the control circuit 54 discriminates in step S91 that an operation signal for a playback instruction is supplied thereto from the operation panel 56, that is, if the user operates the playback button of the operation panel 56, then the processing advances to step S92, in which the control circuit 54 changes over the operation mode of the apparatus to the pause mode.

After the playback mode is entered, the digital television monitor 32 updates the stored contents of the frame memory 55 with the image data transmitted thereto from the hard disk recorder 31 as described hereinabove in connection with the memory process of FIG. 5. Further, the digital television monitor 32 supplies the image data transmitted thereto from the hard disk recorder 31 to the display 53 so that the image data are displayed on the display 53.

After the processing in step S92, the processing advances to step S93, in which the control circuit 54 controls the interface circuit 51 to transmit a playback mode transition signal as a message representing that the digital television monitor 32 has entered the playback mode. Thereafter, the control circuit 54 performs the playback mode process which is hereinafter described.

Now, a process of the control circuit 44 of the hard disk recorder 31 in the stop mode is described with reference to FIG. 14B.

In the stop mode, the hard disk recorder 31 does not particularly perform any process, and in step S101, the control circuit 44 supervises the channel of the IEEE 1394 cable 3 for delivery of a controlling message and discriminates whether or not a playback mode transition signal is transmitted thereto from the digital television monitor 32.

If it is discriminated in step S101 that a playback mode transition signal is not transmitted from the hard disk recorder 31, that is, if a playback mode transition signal is not received by the interface circuit 43 of the hard disk recorder 31, then the processing returns to step S101.

If the control circuit 44 discriminates in step S101 that a playback mode transition signal is transmitted thereto from the digital television monitor 32, that is, if a playback mode transition signal from the digital television monitor 32 is received by the interface circuit 43, then the processing advances to step S102, in which the control circuit 44 changes over the operation mode of the apparatus to the playback mode. Thereafter, the processing advances to step S103.

In step S103, the signal processing circuit 42 starts playback from the hard disk 41 of image data of a sequence designated by the playback mode transition signal or the like transmitted thereto from the digital television monitor 32. Thereafter, the control circuit 44 performs a playback mode process which is hereinafter described.

It is to be noted that, after the playback mode is entered, the interface circuit 43 transmits image data played back from the hard disk 41 to the digital television monitor 32 through the IEEE 1394 cable 3.

The digital television monitor 32 has been placed into and is in the playback mode as described above, and the image data from the hard disk recorder 31 are successively stored (overwritten) into the frame memory 55 and displayed on the display 53.

Now, processes of the control circuit 54 of the digital television monitor 32 and the control circuit 44 of the hard disk recorder 31 of FIG. 13 in the playback mode are described with reference to FIGS. 15A and 15B.

First, a process of the control circuit 54 of the digital television monitor 32 is described with reference to FIG. 15A.

In the playback mode, the digital television monitor 32 displays image data transmitted thereto from the hard disk recorder 31 on the display 53 as described hereinabove with reference to FIGS. 14A and 14B.

Then in step S111, the control circuit 54 discriminates whether or not an operation signal for a pause instruction is supplied thereto from the operation panel 56. If the control circuit 54 discriminates that an operation signal is not supplied, then the processing returns to step S111.

If the control circuit 54 discriminates in step S111 that an operation signal for a pause instruction is supplied thereto from the operation panel 56, that is, if the user operates the pause button of the operation panel 56, then the processing advances to step S112, in which the control circuit 54 changes over the operation mode of the apparatus to the pause mode.

After the digital television monitor 32 enters the pause mode as described above, the digital television monitor 32 repetitively reads out an image stored in the frame memory 55 and supplies the image to the display 53 so that the image is displayed on the display 53 as described hereinabove in connection with the memory process of FIG. 5. Accordingly, in the pause mode, image data of the last frame stored in the frame memory 55 are displayed on the display 53.

Thereafter, the processing advances to step S113, in which the control circuit 54 controls the interface circuit 51 to transmit a pause mode transition signal as a message representing that the digital television monitor 32 has entered the pause mode. Consequently, a pause mode transition signal is transmitted to the hard disk recorder 31 through the IEEE 1394 cable 3.

Thereafter, the control circuit 54 of the digital television monitor 32 performs a pause mode process which is hereinafter described.

Now, a process of the control circuit 44 of the hard disk recorder 31 in the playback mode is described with reference to FIG. 15B.

In the playback mode, the hard disk recorder 31 plays back image data and transmits the image data to the digital television monitor 32 through the IEEE 1394 cable 3 as described hereinabove with reference to FIGS. 14A and 14B.

Then in step S121, the control circuit 44 discriminates whether or not a pause mode transition signal is transmitted thereto from the digital television monitor 32. If it is discriminated in step S121 that a pause mode transition signal is not transmitted thereto, that is, if a pause mode transition signal is not received by the interface circuit 43 of the hard disk recorder 31, then the processing returns to step S121.

If the control circuit 44 discriminates in step S121 that a pause mode transition signal is transmitted thereto from the digital television monitor 32, that is, if a pause mode transition signal from the digital television monitor 32 is received by the interface circuit 43, then the processing advances to step S122, in which the control circuit 44 changes over the operation mode of the apparatus to the pause mode.

After the pause mode is entered, the signal processing circuit 42 stops the playback of image data from the hard disk 41, and the interface circuit 43 stops the transmission of image data through the IEEE 1394 cable 3. It is to be noted that the signal processing circuit 42 places the hard disk 41 into a standby state so that the playback is resumed immediately from a frame next to a frame of the image data which has been played back last from the hard disk 41.

Since, in the pause mode, playback and transmission of an image by the hard disk recorder 31 are stopped as described above, the transmission bandwidth for IEEE 1394 communication is not used for repetitive transmission of image data of the same frame as in the prior art. Therefore, the transmission bandwidth can be utilized effectively. Further, use of the transmission bandwidth by another application is not limited at all.

Furthermore, since the last image data stored in the frame memory 55 are repetitively read out and displayed by the digital television monitor 32, moving pictures of a pause state are displayed similarly as in the prior art.

Now, processes of the control circuit 54 of the digital television monitor 32 and the control circuit 44 of the hard disk recorder 31 of FIG. 13 in the pause mode are described with reference to FIGS. 16A and 16B.

First, a process of the control circuit 54 of the digital television monitor 32 is described with reference to FIG. 16A.

As described hereinabove, in the pause mode, the digital television monitor 32 repetitively reads out and displays the last image data stored in the frame memory 55.

Then, the control circuit 54 supervises the operation signal from the operation panel 56 and discriminates in step S131 whether or not the user operates the operation panel 56 so as to cancel the pause. If it is discriminated in step S131 that the user does not operate the operation panel 56 so as to cancel the pause, then the processing returns to step S131.

If it is discriminated in step S131 that the user operates the operation panel 56 so as to cancel the pause, then the processing advances to step S132, in which the control circuit 54 sets the operation mode of the apparatus to the playback mode. After the playback mode is entered, the digital television monitor 32 updates the stored contents of the frame memory 55, as described in the memory process shown in FIG. 5, with image data transmitted thereto from the hard disk recorder 31 in such a manner as hereinafter described and displays the image data on the display 53.

Then, the processing advances to step S133, in which the control circuit 54 controls the interface circuit 51 to transmit a playback mode transition signal as a message representing that the digital television monitor 32 has entered the playback mode. Thereafter, the control circuit 54 performs the playback process mode described hereinabove with reference to FIG. 15A.

Now, a process of the control circuit 44 of the hard disk recorder 31 in the pause mode is described with reference to FIG. 16B.

In the pause mode, the hard disk recorder 31 stops playback and transmission of image data as described with reference to FIG. 15B.

Then, the control circuit 44 supervises the channel of the IEEE 1394 cable 3 for delivery of a controlling message and discriminates in step S141 whether or not a playback mode transition signal is transmitted thereto from the digital television monitor 32.

If it is discriminated in step S141 that a playback mode transition signal is not transmitted thereto, that is, if a playback mode transition signal is not received by the interface circuit 43 of the hard disk recorder 31, then the processing returns to step S141.

If the control circuit 44 discriminates in step S141 that a playback mode transition signal is transmitted thereto from the digital television monitor 32, that is, if a playback mode transition signal from the digital television monitor 32 is received by the interface circuit 43, then the processing advances to step S142, in which the control circuit 44 changes over the operation mode of the apparatus to the playback mode. Thereafter, the processing advances to step S143.

In step S143, the signal processing circuit 42 controls the hard disk 41 so that the playback is resumed from a frame next to a frame of the image data which has been played back immediately before the pause mode is entered. Further, the interface circuit 43 resumes transmission of image data through the IEEE 1394 cable 3. As a result, image data played back from the hard disk 41 are transmitted to the digital television monitor 32 by the interface circuit 43.

Thereafter, the control circuit 44 of the hard disk recorder 31 performs the playback mode process described hereinabove with reference to FIG. 15B.

FIG. 17 shows an example of configuration of an additional AV system to which the present invention is applied. It is to be noted that, in FIG. 17, like elements to those of FIG. 13 are denoted by like reference numerals and description of them is suitably omitted herein to avoid redundancy.

The AV system of FIG. 17 has a basically similar configuration to that of FIG. 13 except that it includes, in addition to the digital television monitor 32, a digital television monitor 81 as a digital television monitor which receives and displays image data from the hard disk recorder 31 and that the hard disk recorder 31 has a modified internal configuration.

The digital television monitor 81 has a configuration similar to that of the digital television monitor 32. However, transmission of image data from the hard disk recorder 31 to the digital television monitor 81 is performed in accordance with the pull type similarly to the transmission of image data from the hard disk recorder 31 to the digital television monitor 32. More particularly, transmission operations of image data from the hard disk recorder 31 to the digital television monitors 32 and 81 are performed independently of each other in response to requests from the digital television monitors 32 and 81. Accordingly, in the AV system of FIG. 17, image data transmitted from the hard disk recorder 31 to the digital television monitor 81 and image data transmitted from the hard disk recorder 31 to the digital television monitor 32 need not necessarily be the same.

In order to transmit image data to the two digital television monitors 32 and 81 independently of each other, the hard disk recorder 31 includes not the single signal processing circuit 42 but a pair of signal processing circuits 42A and 42B. The hard disk recorder 31 additionally includes a switch 46 and a pair of buffers 47A and 47B.

The switch 46 selects one of a pair of terminals 46A and 46B thereof under the control of the control circuit 44. The terminal 46A is connected to the buffer 47A while the terminal 46B is connected to the buffer 47B. Accordingly, accessing to the hard disk 41 is performed from the signal processing circuit 42A through the buffer 47A and the switch 46 or from the signal processing circuit 42B through the buffer 47B and the switch 46.

In particular, in order to record image data onto the hard disk 41, the image data of the object of recording are supplied from the signal processing circuit 42A to the buffer 47A or supplied from the signal processing circuit 42B to the buffer 47B. Then, the buffer 47A temporarily stores the image data from the signal processing circuit 42A, and the buffer 47B temporarily stores the image data from the signal processing circuit 42B.

The switch 46 time-divisionally selects the terminals 46A and 46B alternately under the control of the control circuit 44. When the switch 46 selects the terminal 46A, the image data stored in the buffer 47A are read out through the switch 46 and supplied to and recorded onto the hard disk 41. On the other hand, when the switch 46 selects the terminal 46B, the image data stored in the buffer 47B are read out through the switch 46 and supplied to and recorded onto the hard disk 41.

On the other hand, when image data are read out from the hard disk 41, if the switch 46 selects the terminal 46A, then the image data read out from the hard disk 41 are supplied through the switch 46 to and temporarily stored into the buffer 47A. However, if the switch 46 selects the terminal 46B, then the image data read out from the hard disk 41 are supplied through the switch 46 to and temporarily stored into the buffer 47B. The image stored in the buffer 47A are supplied through the signal processing circuit 42A to the interface circuit 43 and further supplied, for example, to the digital television monitor 32 through the IEEE 1394 cable 3. On the other hand, the image data stored in the buffer 47B are supplied through the signal processing circuit 42B to the interface circuit 43 and further supplied, for example, to the digital television monitor 81 through the IEEE 1394 cable 3.

In this manner, image data can be transmitted simultaneously from the hard disk recorder 31 without being interrupted to the digital television monitors 32 and 81 in accordance with requests from the digital television monitors 32 and 81, respectively.

It is to be noted that the hard disk 41 in the AV system of FIG. 17 operates at a transfer rate sufficient to read out image data for 2 channels to be transmitted to the digital television monitors 32 and 81. Accordingly, the readout rate of image data from the hard disk 41 here is at least twice the playback rate of image data.

Now, processes of the control circuit 54 of the digital television monitors 32 and 81 and the control circuit 44 of the hard disk recorder 31 in FIG. 17 are described with reference to FIGS. 18A to 20B.

FIGS. 18A and 18B, 19A and 19B, and 20A and 20B represent processes of the control circuits 54 and 44 in the stop mode, the playback mode and the pause mode, respectively.

Figure 14B:
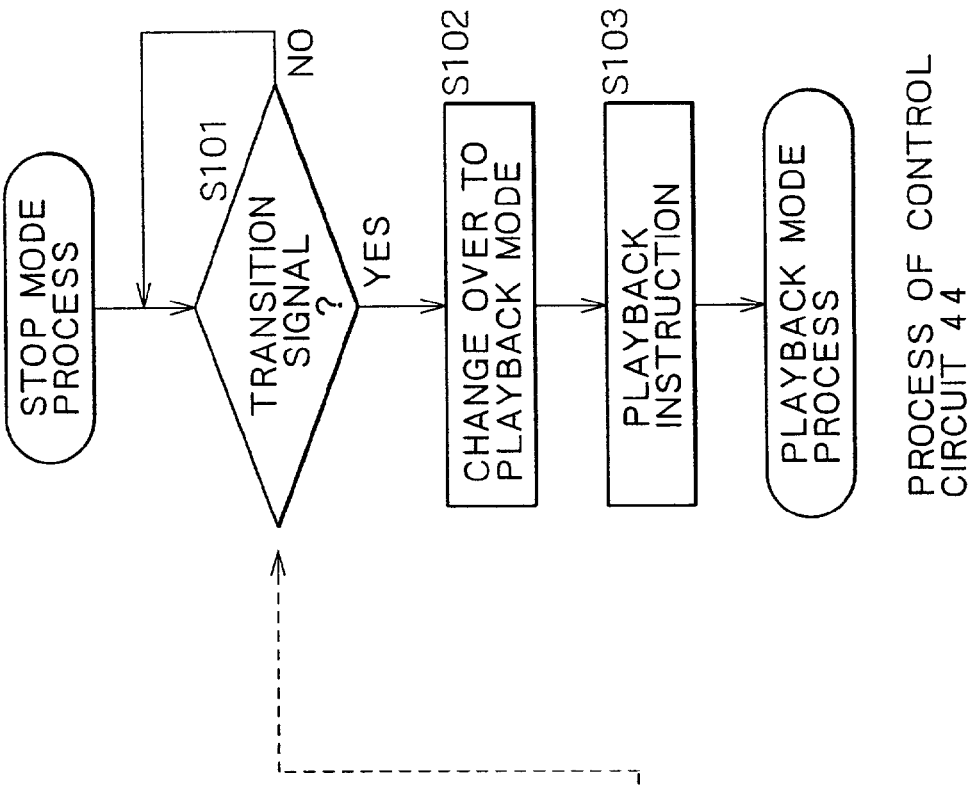
FIGS. 14A and 14B are flow charts illustrating a stop mode process of the AV system of FIG. 13.
Figure 14A:
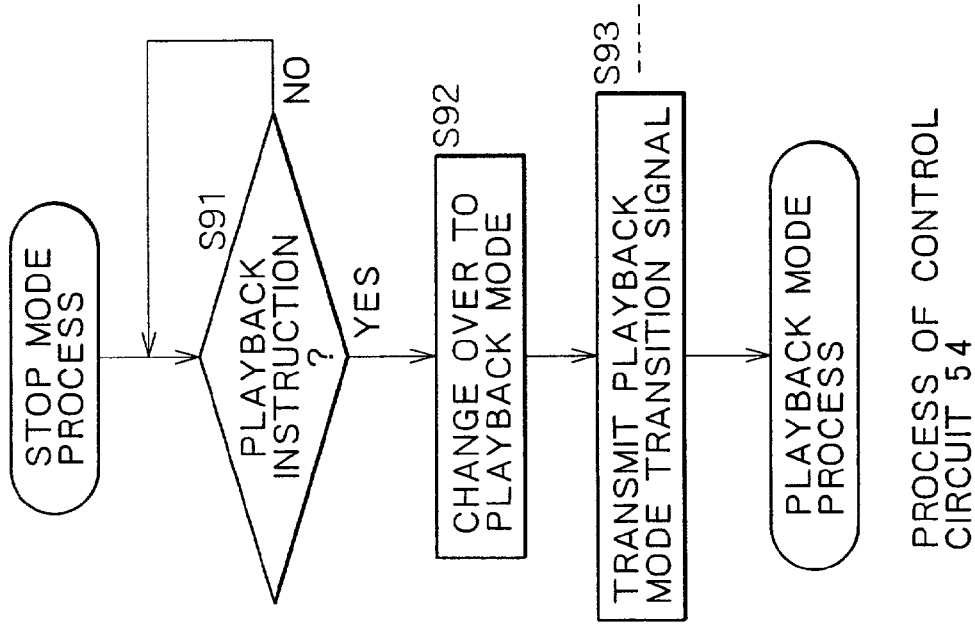
Figure 16B:
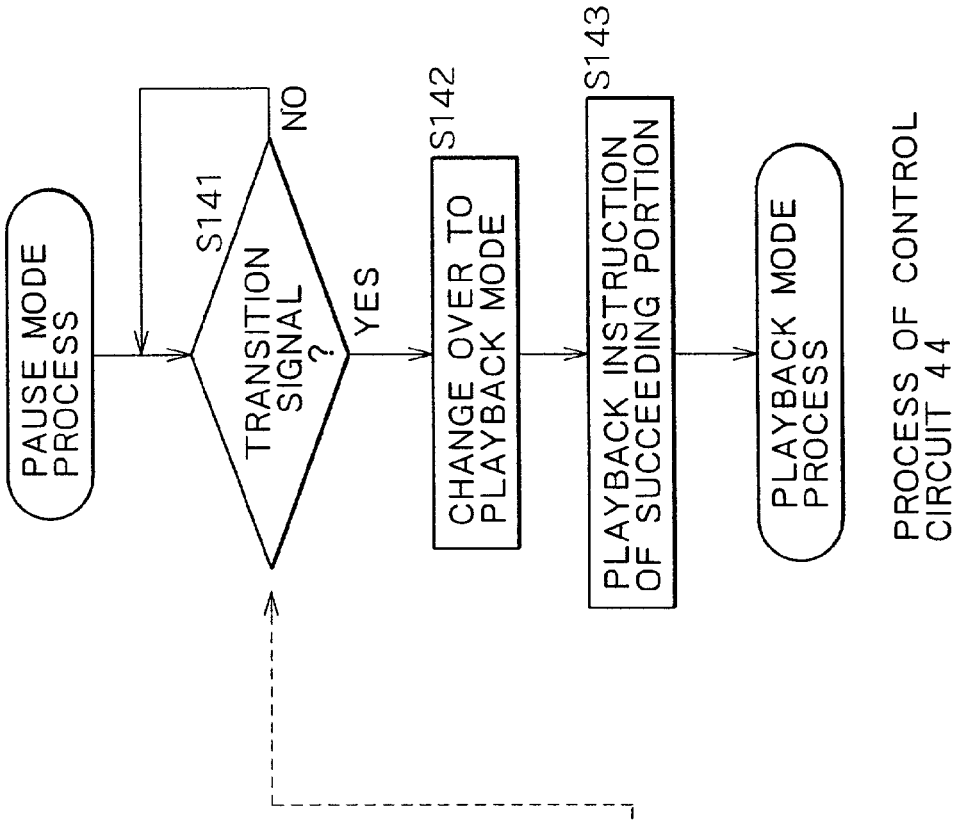
FIGS. 16A and 16B are flow charts illustrating a pause mode process of the AV system of FIG. 13.
Figure 16A:
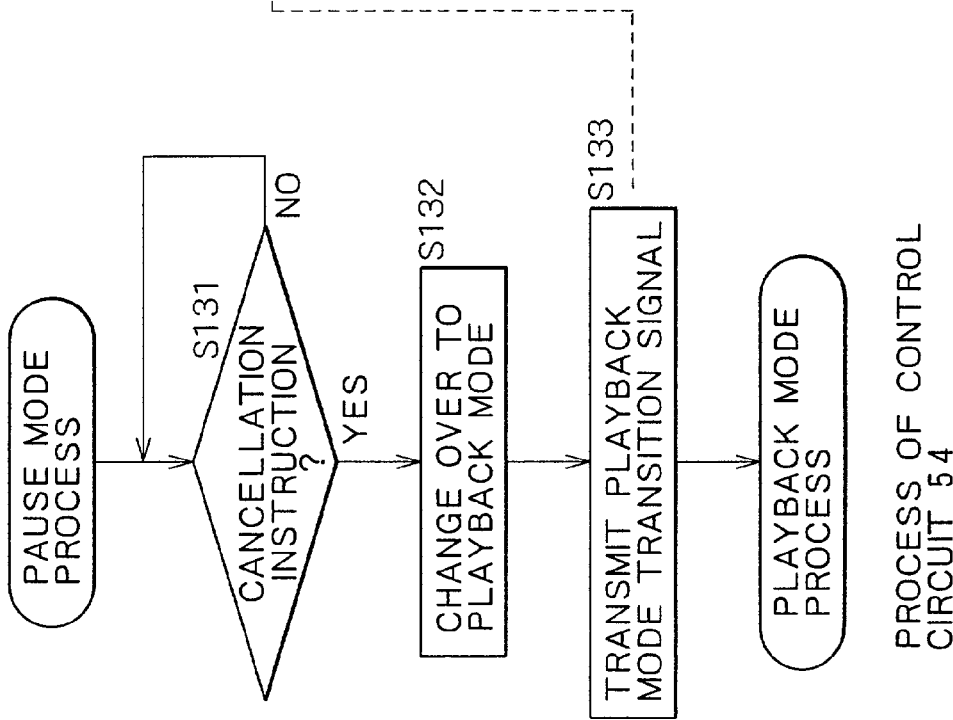
Figure 18A:
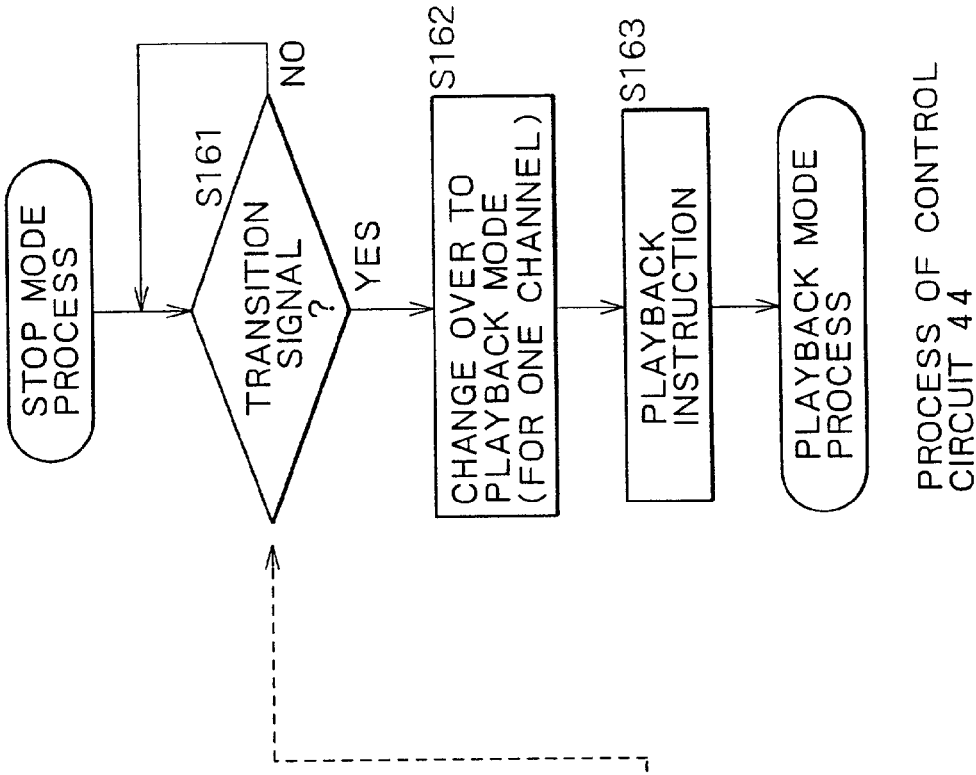
FIGS. 18A and 18B are flow charts illustrating a stop mode process of the AV system of FIG. 17.
Figure 18B:
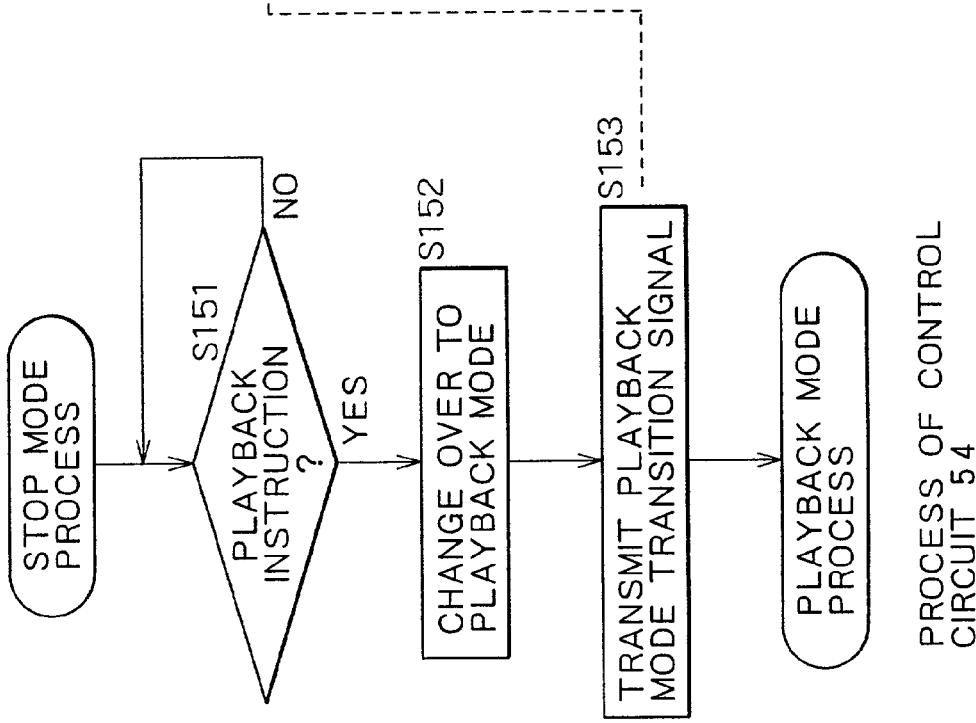
Figure 19A:
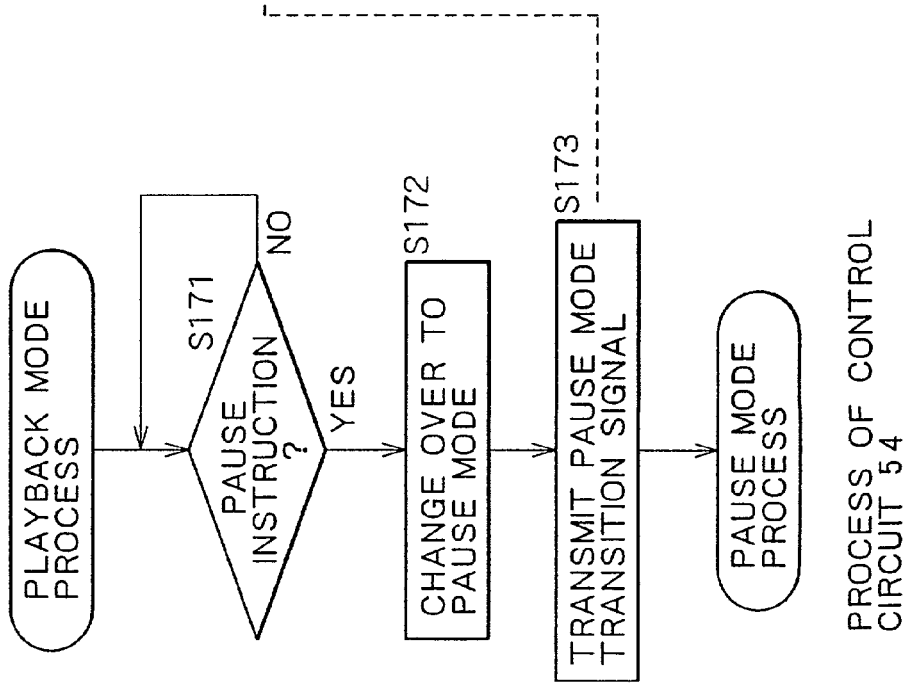
FIGS. 19A and 19B are flow charts illustrating a playback mode process of the AV system of FIG. 17.
Figure 19B:
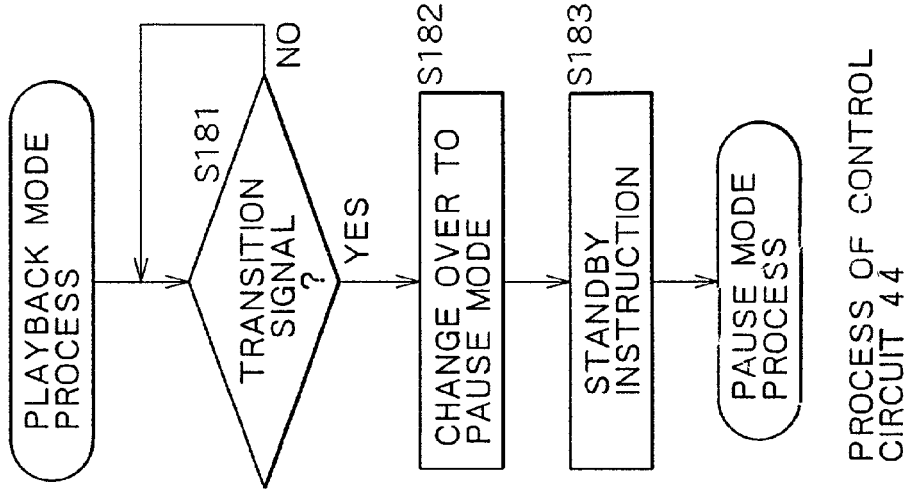
Figure 20B:
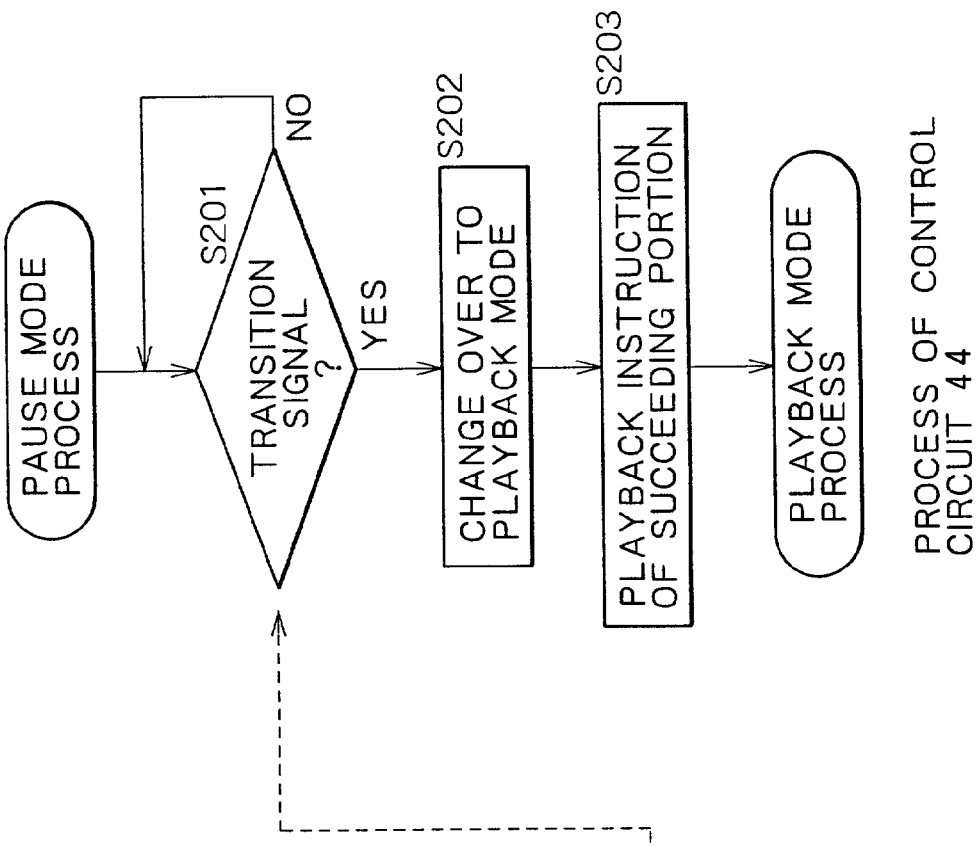
FIGS. 20A and 20B flow charts illustrating a pause mode process of the AV system of FIG. 17.
Figure 20A:
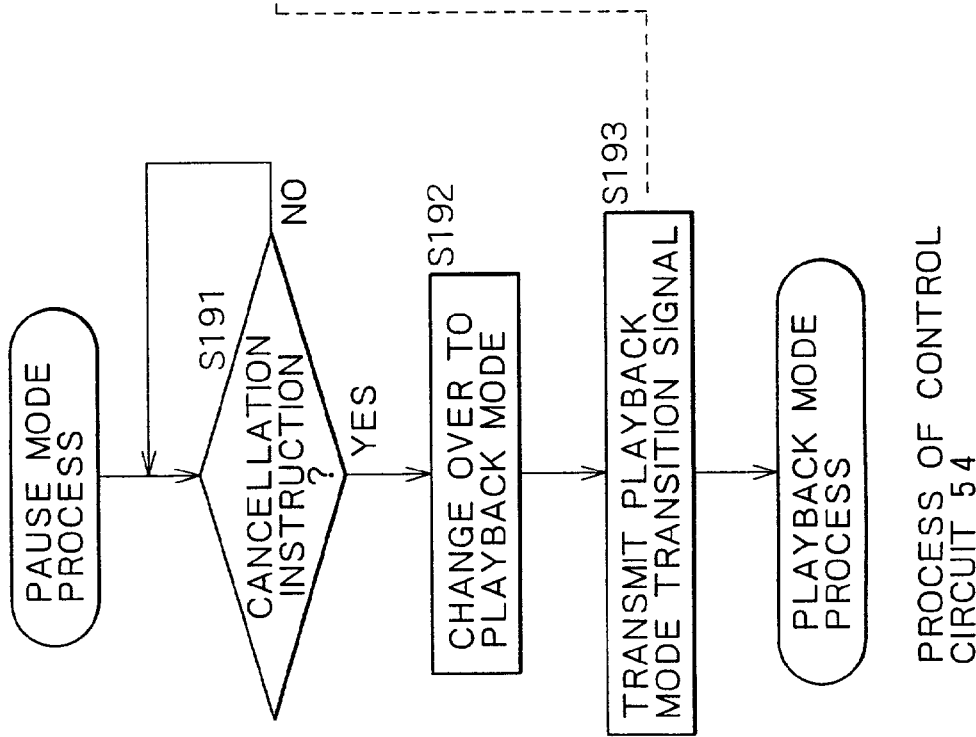

It is to be noted that, in steps S151 to S153 of FIG. 18A, processes similar to those in steps S91 to S93 of FIG. 14A are performed, respectively; in steps S161 to S163 of FIG. 18B, processes similar to those in steps S101 to S103 of FIG. 14B are performed, respectively; in steps S171 to S173 of FIG. 19A, processes similar to those in steps S111 to S113 of FIG. 15A are performed, respectively; in steps S181 to S183 of FIG. 19B, processes similar to those in steps S121 to S123 of FIG. 15B are performed, respectively; in steps S191 to S193 of FIG. 20A, processes similar to those in steps S131 to S133 of FIG. 16A are performed, respectively; and in steps S201 to S203 of FIG. 20B, processes similar to those in steps S141 to S143 of FIG. 16B are performed, respectively. Therefore, overlapping detailed description of them is omitted herein to avoid redundancy.

It is to be noted, however, that, if it is assumed that, for example, the signal processing circuit 42A and the buffer 47A are referred to as A channel system and the signal processing circuit 42B and the buffer 47B are referred to as B channel system and transmission of image data to the digital television monitor 32 is performed by the A channel system while transmission of image data to the digital television monitor 81 is performed by the B channel system, then the processes of the stop mode, playback mode and pause mode for the A channel system and the B channel system are performed independently of each other by the hard disk recorder 31.

In particular, for example, if the hard disk recorder 31 receives a playback mode transition signal in the process in the stop mode of FIG. 18, then it changes over the operation mode to the playback mode in step S162. However, this transition to the playback mode is performed for only one of the A channel system and the B channel system which corresponds to one of the digital television monitors which has transmitted the playback mode transition signal. More particularly, if the digital television monitor 32 has transmitted the playback mode transition signal, then the A channel system which takes charge of the digital television monitor 32 is placed into the playback mode. However, if the digital television monitor 81 has transmitted the playback mode transition signal, then the B channel system which takes charge of the digital television monitor 81 is placed into the playback mode. This similarly applies to transition to the pause mode.

Accordingly, also in the AV system of FIG. 17, since playback and transmission of an image by the hard disk recorder 31 are stopped in the pause mode, the transmission bandwidth for IEEE 1394 communication is not used for repetitive transmission of image data of the same frame as in the prior art, and consequently, the transmission bandwidth can be utilized efficiently. Further, use of the transmission bandwidth by another application is not limited at all. In particular, where different IEEE 1394 apparatus 82 and 83 are connected to the hard disk recorder 31 and the digital television monitors 32 and 81 through the IEEE 1394 cable 3 as indicated by broken lines in FIG. 17, the transmission bandwidth for IEEE 1394 communication between the IEEE 1394 apparatus 82 and 83 can be prevented from being limited in the pause mode.

Figure 21:
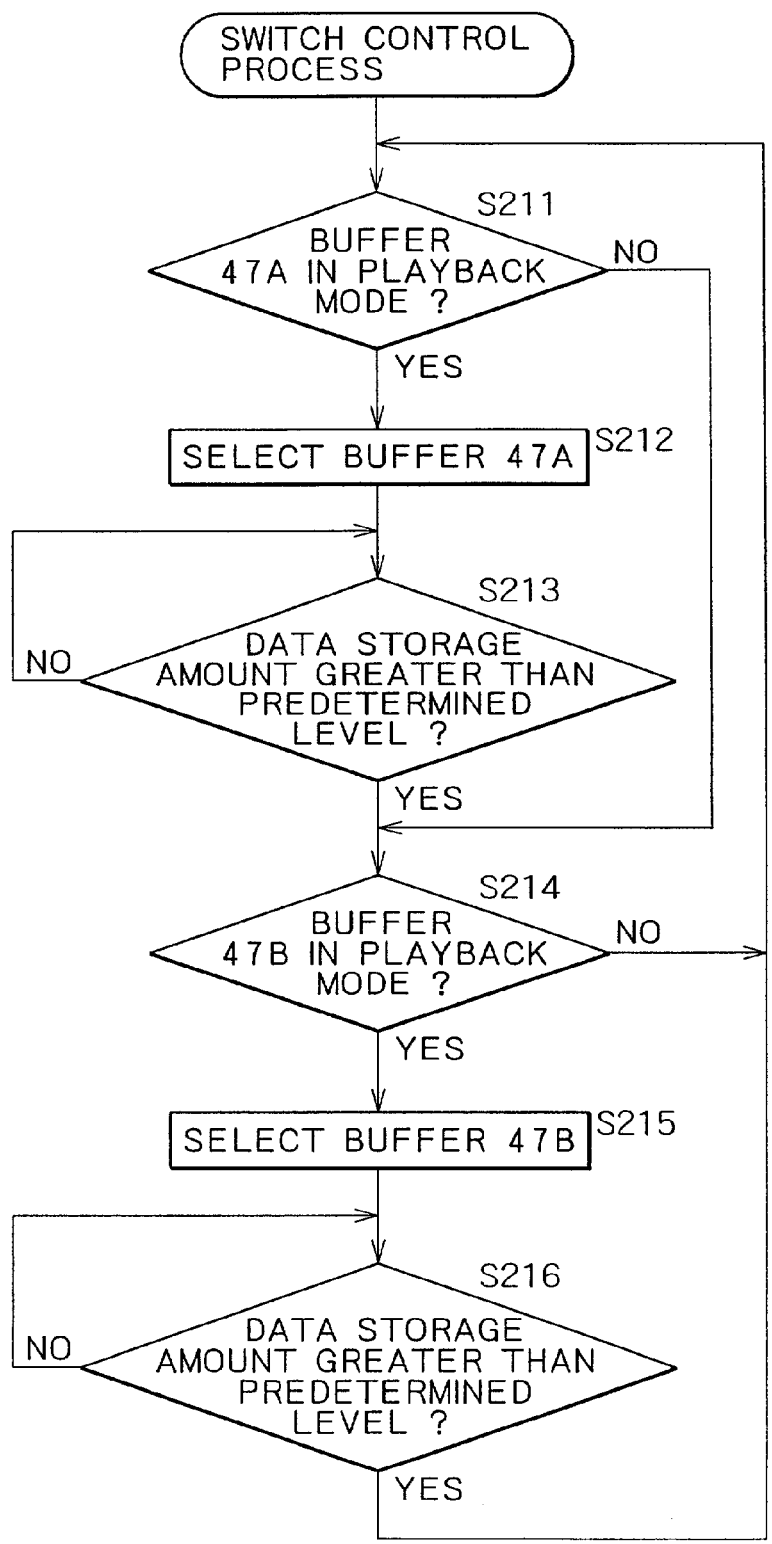
FIG. 21 is a flow chart illustrating a switch control process of the AV system of FIG. 17.

Now, a control process of the switch 46 by the control circuit 44 of the hard disk recorder 31 when image data are read out from the hard disk 41 of FIG. 17 is described with reference to FIG. 21.

First in step S211, the control circuit 44 discriminates whether or not the A channel system is in the playback mode. If the control circuit 44 discriminates that the A channel system is not in the playback mode, then the processing advances to step S214 skipping steps S212 and S213.

On the other hand, if it is discriminated in step S211 that the A channel system is in the playback mode, then the processing advances to step S212, in which the control circuit 44 controls the switch 46 to select the terminal 46A connected to the buffer 47A. Then, the processing advances to step S213, in which the control circuit 44 discriminates whether or not the data storage amount of the buffer 47A is greater than a predetermined threshold value. If it is discriminated in step S213 that the data storage amount of the buffer 47A is not greater than the predetermined threshold value, that is, if the data storage amount of the buffer 47A is such that, for example, if supply of image data from the hard disk 41 to the buffer 47A is temporarily stopped, then image data stored in the buffer 47A are all transmitted to the digital television monitor 32 before supply of image data from the hard disk 41 to the buffer 47A is started subsequently and consequently display of image data by the digital television monitor 32 is interrupted, then the processing returns to step S213.

Accordingly, in this stance, even if supply of image data from the hard disk 41 to the buffer 47A temporarily stops, the processing in step S213 is repeated until after image data of an amount with which the display of image data by the digital television monitor 32 is not interrupted before supply of image data from the hard disk 41 to the buffer 47A is started subsequently, and within this period, image data read out from the hard disk 41 are supplied through the switch 46 to and stored into the buffer 47A.

On the other hand, if it is discriminated in step S213 that the data storage amount of the buffer 47A is greater than the predetermined threshold value, that is, if the data storage amount of the buffer 47A is such that, even if supply of image data from the hard disk 41 to the buffer 47A is temporarily stopped, display of image data by the digital television monitor 32 is not interrupted before supply of image data from the hard disk 41 to the buffer 47A is started subsequently, then the processing returns to step S214.

In step S214, the control circuit 44 discriminates whether or not the B channel system is in the playback mode. If the control circuit 44 discriminates that the B channel system is not in the playback mode, then the processing returns to step S211 skipping steps S215 and S216.

On the other hand, if it is discriminated in step S214 that the B channel system is in the playback mode, then the processing advances to step S215, in which the control circuit 44 controls the switch 46 to select the terminal 46B connected to the buffer 47B. Then, the processing advances to step S216, in which the control circuit 44 discriminates whether or not the data storage amount of the buffer 47B is greater than a predetermined threshold value. If it is discriminated that the data storage amount of the buffer 47B is not greater than a predetermined threshold value in step S216, that is, if the data storage amount of the buffer 47B is such that, for example, if supply of image data from the hard disk 41 to the buffer 47B is temporarily stopped, then image data stored in the buffer 47B are all transmitted to the digital television monitor 81 before supply of image data from the hard disk 41 to the buffer 47B is started subsequently and consequently display of image data by the digital television monitor 81 is interrupted, then the processing returns to step S216.

Accordingly, also in this stance, similarly as in step S213 described hereinabove, even if supply of image data from the hard disk 41 to the buffer 47B temporarily stops, the processing in step S216 is repeated until after image data of an amount with which the display of image data by the digital television monitor 81 is not interrupted before supply of image data from the hard disk 41 to the buffer 47B is started subsequently are stored into the buffer 47B, and within this period, image data read out from the hard disk 41 are supplied through the switch 46 to and stored into the buffer 47B.

On the other hand, if it is discriminated in step S216 that the data storage amount of the buffer 47B is greater than the predetermined threshold value, that is, if the data storage amount of the buffer 47B is such that, even if supply of image data from the hard disk 41 to the buffer 47B is temporarily stopped, display of image data by the digital television monitor 81 is not interrupted before supply of image data from the hard disk 41 to the buffer 47B is started subsequently, then the processing returns to step S211.

Here, since the readout rate of image data from the hard disk 41 is twice or more the playback rate of image data as described hereinabove, even if the hard disk 41 tries to transfer image data to the buffer 47A or 47B, the data storage amount of the buffer 47A or 47B may possibly be an upper limit value to it. In such an instance, transfer of image data from the hard disk 41 to the buffer 47A or 47B is performed after it is waited that a free area appears in the buffer 47A or 47B. It is to be noted that such transfer control as just described may be performed by the control circuit 44 or alternatively a control line may be provided between the hard disk 41 and each of the buffers 47A and 47B such that the transfer control may be performed between the hard disk 41 and the buffer 47A or 47B.

According to such a switch control process as just described, when both of the A channel system and the B channel system are in the playback mode, theoretically the switch 46 time-divisionally selects the terminals 46A and 46B alternately. Then, if only one of the A channel system and the B channel system, for example, only the A channel system, is placed into the pause mode, then the switch 46 stops selection of the terminal 46A connected to the buffer 47A but selects only the terminal 46B. Then, if also the B channel system as the other of the A channel system and the B channel system is placed into the pause mode, then the switch 46 stops also selection of the terminal 46B. Consequently, also readout of image data from the hard disk 41 is stopped.

Thereafter, if only the A channel system as one of the A channel system and the B channel system is placed into the playback mode, then the switch 46 now selects only the terminal 46A connected to the buffer 47A, and readout of image data from the hard disk 41 is started in accordance with the necessity. Further, if also the B channel system as the other of the A channel system and the B channel system is placed into the playback mode, then the switch 46 time-divisionally selects the terminals 46A and 46B alternately.

While the series of processes described above can be executed by hardware for exclusive use, it may otherwise be executed by software. Where the series of processes is executed by software, a program which constructs the software is installed into a computer for exclusive use or the like.

Figure 22:
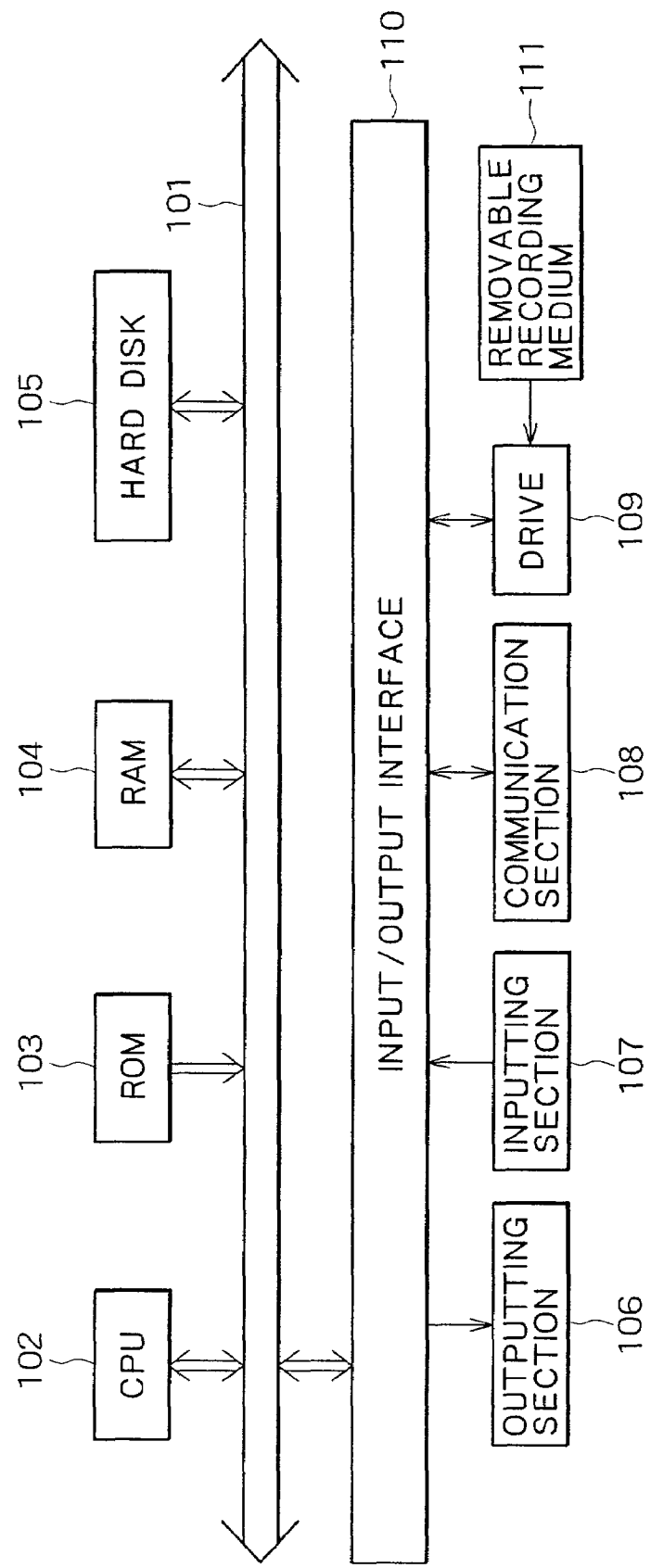
FIG. 22 is a block diagram showing an example of configuration of a computer to which the present invention is applied.

FIG. 22 shows an example of configuration of a computer into which a program for execution of the series of processes described hereinabove is installed.

The program can be recorded in advance on a hard disk 105 or in a ROM 103 as a recording medium built in the computer.

Alternatively, the program may be stored (recorded) temporarily or permanently on a removable recording medium 111 such as a floppy disc, a CD-ROM (Compact Disc Read Only Memory), an MO (Magneto-optical) disk, a DVD (Digital Versatile Disc), a magnetic disk or a semiconductor memory. The removable recording medium 111 of the type mentioned can be provided as package software.

It is to be noted that the program not only can be installed from such a removable recording medium 111 as described above into the computer, but also can be transferred by radio from a download site to the computer through an artificial satellite for digital satellite broadcasting or by wire to the computer through a network such as LAN (Local Area Network) or the Internet such that the computer may receive the program transferred in this manner by means of a communication section 108 and install the program into the hard disk 105 built therein.

The computer has a CPU (Central Processing Unit) 102 built therein. An input/output interface 110 is connected to the CPU 102 through a bus 101. If the user operates an inputting section 107 formed from a keyboard, a mouse, a microphone and so forth to issue an instruction, then the instruction is inputted to the CPU 102 through the input/output interface 110, and the CPU 102 executes a program stored in the ROM (Read Only Memory) 103 in accordance with the instruction. Or, the CPU 102 loads a program stored on the hard disk 105, a program transferred from a satellite or a network, received by the communication section 108 and installed on the hard disk 105 or a program read out from the removable recording medium 111 loaded in a drive 109 and installed in the hard disk 105 into a RAM (Random Access Memory) 104 and executes the thus loaded program. Consequently, the CPU 102 executes the processing described hereinabove with reference to the flow charts or processing available with the configurations described hereinabove with reference to the block diagrams. Then, when necessary, the CPU 102 causes a result of such processing to be, for example, outputted from an outputting section 106 formed from an LCD (Liquid Crystal Display) unit, a speaker and so forth, transmitted from the communication section 108 or recorded onto the hard disk 105 through the input/output interface 110.

It is to be noted that, in the present specification, the steps which describe a program, for executing various processes by a computer, recorded in or on a recording medium need not necessarily be processed in a time series in the order as described in the flow charts, and include processes which are executed parallelly or individually (for example, parallel processing or processing by an object).

Further, the program may be processed by a single computer or may otherwise be processed discretely by a plurality of computers. Furthermore, the program may be transferred to and executed by a computer at a remote place.

It is to be noted that the present invention can be applied also to IEEE 1394 apparatus in addition to a camcorder, a hard disk recorder and a digital television monitor. More particularly, the present invention can be applied, for example, to such a computer as shown in FIG. 22 which is equipped with an IEEE 1394 interface. Further, the present invention can be applied to apparatus which transmit or receive image data in accordance with a communication system other than the IEEE 1394 communication or through the Internet.

Further, while the AV systems described above adopt image data of the DV system, the present invention can be applied also to image data compression-coded, for example, in accordance with the MPEG (Moving Picture Experts Group) or the like or image data which are not in such a compression-coded state.

Further, while the storage capacity of the frame memory 27 or 55 in the AV systems described above is 1 frame, the storage capacity may otherwise be greater than 1 frame.

While preferred embodiments of the present invention have been described using specific terms, such description is for illustrative purposes only, and it is to be understood that changes and variations may be made without departing from the spirit or scope of the following claims.

What is claimed is:

1. An image processing apparatus, comprising:
   a playback section for playing back image data in successive frames;
   a transmission section for transmitting the successive frames of the played back image data to a reception apparatus through a predetermined transmission line;
   said reception apparatus having a temporary store to temporarily store one frame of the successive frames of the played back image data transmitted thereto, the stored frame being replaced by a following frame of the successive frames that are received; and
   a control section for updating the frame stored in said temporary store with new successive frames that are received by said reception apparatus, said control section controlling, when an instruction to temporarily stop the playback of the image data is received, said playback section and said transmission section to stop the playback and the transmission of the image data, respectively, and further controlling said transmission section to transmit a message representing that the playback of the image data is temporarily stopped to said reception apparatus through said transmission line, wherein the temporary store stores only one frame of the successive frames while playback of the image data is temporarily stopped and no longer is updated with new frames and the image data of the one frame last stored in said temporary store is repetitively read out while said playback and transmission sections are stopped,
   wherein the control section establishes on said transmission line, a first channel for transmission of said image data and a second channel for transmission of said message.

2. An image processing apparatus according to claim 1, wherein, when an instruction to cancel the temporary stop is received, said control section controls said playback section and said transmission section to resume the playback and the transmission of the image data, respectively, and further controls said transmission section to transmit a message representing that the playback of the image data is resumed to said reception apparatus through said transmission line.

3. An image processing apparatus according to claim 1, wherein said transmission section transmits the image data also to an additional reception apparatus or apparatuses through said transmission line.

4. An image processing apparatus according to claim 1, wherein said transmission line can be a wired transmission medium which complies with the IEEE 1394 standard or a wireless transmission medium.

5. An image processing method, comprising:
a playback step of playing back image data in successive frames;
a transmission step of transmitting the successive frames of the played back image data to a reception apparatus through a predetermined transmission line;
a temporary storage step of temporarily storing in a temporary store one frame of the successive frames of the played back image data transmitted to the reception apparatus, the stored frame being replaced by a following frame of the successive frames that are received;
a control step of updating the frame stored in said temporary store with new successive frames that are received, and of stopping, when an instruction to temporarily stop the playback of the image data is issued, the playback of the image data by the playback step and the transmission of the image data by the image transmission step so that the temporary store stores only one frame of the successive frames while playback of the image data is temporarily stopped and no longer is updated with new frames; and
a message transmission step of transmitting a message representing that the playback of the image data is temporarily stopped to said reception apparatus through said transmission line, and
a repetitive read out step of repetitively reading out the one frame of image data last stored at the reception apparatus while the playback and transmission of the image data are temporarily stopped;
wherein the control step establishes on said transmission line, a first channel for transmission of said image data and a second channel for transmission of said message.

6. An image processing apparatus, comprising:
a reception section for receiving successive frames of played back image data transmitted thereto from a transmission apparatus through a predetermined transmission line;
a storage section having a storage capacity of one frame for temporarily storing one frame of the successive frames of the played back image data received by said reception section, the stored frame being replaced by a following frame of the successive frames that are received;
a display apparatus to display the image data temporarily stored in said storage section; and
a control section for updating the frame stored in said storage section with new successive frames that are received by said reception section, said control section controlling, when a message representing that playback of the image data is temporarily stopped is received through said transmission line, said storage section to store only one frame of the successive frames while playback of the image data is temporarily stopped and no longer update the frame stored therein, and said control section controlling said display apparatus to repetitively read out and display the image data of the one frame last stored in said one-frame storage section,
wherein said image data is received on a first channel of said transmission line and said message is received on a second channel of said transmission line.

7. An image processing apparatus according to claim 6, wherein, when a message representing that the playback of the image data is resumed is received through said transmission line, said control section controls said display section to display the image data received thereafter by said reception section, and
wherein said control section supervises the second channel for delivery of said message.

8. An image processing apparatus according to claim 6, wherein said storage section has a storage capacity for one screen.

9. An image processing apparatus according to claim 6, wherein said transmission line can be a wired transmission medium which complies with the IEEE 1394 standard or a wireless transmission medium.

10. An image processing method, comprising:
a reception step of receiving successive frames of played back image data transmitted thereto from a transmission apparatus through a predetermined transmission line;
a storage step of temporarily storing in a memory having a storage capacity of one frame for temporarily storing one frame of the successive frames of the played back image data received by the reception step, the stored frame being replaced by a following frame of the successive frames that are received;
a display step of displaying the temporarily stored image data; and
a control step of updating the frame stored in said memory with new successive frames that are received, and of controlling, when a message representing that playback of the image data is temporarily stopped is received through said transmission line, said memory to store only one frame of the successive frames while playback of the image data is temporarily stopped and no longer update the frame stored therein, and controlling said display step to repetitively read out and display the last stored image data of one frame,
wherein said image data is received on a first channel of said transmission line and said message is received on a second channel of said transmission line.

11. An image processing apparatus, comprising:
a transmission apparatus for playing back successive frames of image data and transmitting the successive frames of image data through a predetermined transmission line; and
a reception apparatus for receiving the successive frames of image data transmitted thereto from said transmission apparatus through said transmission line;
said transmission apparatus including a playback section for playing back image data, a transmission section for transmitting the played back image data to said reception apparatus through said predetermined transmission line, and a control section for controlling, when an instruction to temporarily stop the playback of the image data is received, said playback section and said transmission section to stop the playback and the transmission of the image data, respectively, and further controlling said transmission section to transmit a message representing that the playback of the image data is temporarily stopped to said reception apparatus through said transmission line,
wherein the control section establishes on said transmission line, a first channel for transmission of said image data and a second channel for transmission of said message;
said reception apparatus including a reception section for receiving successive frames of the played back image data transmitted thereto from said transmission apparatus through said predetermined transmission line, a storage section having storage capacity of one frame for temporarily storing one frame of the successive frames of the played back image data received by said reception section, the stored frame being replaced by a following frame of the successive frames that are received, and a control section for updating the frame stored in said storage section with new successive frames that are received by said reception section, wherein said storage section stores only one frame of the successive frames while playback of the image data is temporarily stopped and no longer updates the frame stored therein, said control section controlling a display apparatus to display the image data temporarily stored in said storage section and controlling, when a message representing that playback of the image data is temporarily stopped is received through said transmission line, said display apparatus to repetitively read out and display the one frame of image data last stored in said storage section.

12. An image processing apparatus, comprising:
a playback section for playing back image data;
a transmission section for transmitting successive frames of the played back image data to a reception apparatus through a predetermined network;
said reception apparatus having a temporary store to temporarily store one frame of the successive frames of the played back image data transmitted thereto, the stored frame being replaced by a following frame of the successive frames that are received; and
a control section for updating the frame stored in said temporary store with new successive frames that are received by said reception apparatus, said control section controlling, when a message representing that an instruction to temporarily stop the playback of the image data is issued through said network, said transmission section to stop the transmission of the image data, said control section controlling the temporary store to store only one frame of the successive frames while playback of the image data is temporarily stopped and no longer update the frame stored therein with new successive frames and for controlling said reception apparatus to repetitively read out from said one-frame temporary store the last stored image data of one frame while said playback of said image data is stopped,
wherein the control section establishes a first channel on a predetermined transmission line for transmission of said image data and a second channel on said transmission line for transmission of said message.

13. An image processing apparatus according to claim 12, wherein, when a message representing that an instruction to cancel the temporary stop is received through said network, said control section controls said transmission section to resume the transmission of the image data.

14. An image processing apparatus according to claim 12, wherein said network can be a wired network which complies with the IEEE 1394 standard or a wireless network.

15. An image processing apparatus according to claim 12, wherein said playback section plays back the image data and said transmission section transmits the image data in response to a request from each of said reception apparatus and an additional reception apparatus or apparatuses.

16. An image processing method, comprising:
a playback step of playing back image data;
a transmission step of transmitting successive frames of the played back image data to a reception apparatus through a predetermined network;
a storage step of temporarily storing in a memory one frame of the successive frames of the played back image data that is transmitted to said reception apparatus, the stored frame being replaced by a following frame of the successive frames that are received; and
a control step of updating the frame stored in said memory with new successive frames that are received by said reception section, said control step stopping, when a message representing that an instruction to temporarily stop the playback of the image data is issued through said network, the transmission of the image data by the transmission step, said control step controlling the memory to store only one frame of the successive frames while playback of the image data is temporarily stopped and no longer update the frame stored therein with a new successive frame and for causing the one frame of image data last stored to be repetitively read out while the playback of said image data is stopped,
wherein the control step establishes a first channel on a predetermined transmission line for transmission of said image data and a second channel on said transmission line for transmission of said message.

17. An image processing apparatus, comprising:
a reception section for receiving successive frames of played back image data transmitted thereto from a transmission apparatus through a predetermined network;
a storage section having a storage capacity for temporarily storing one frame of the successive frames of the played back image data received by said reception section, the stored frame being replaced by a following frame of the successive frames that are received such that the frame stored in said storage section is updated with new successive frames that are received by said reception section;
a display apparatus for displaying the image data received by said reception section and temporarily stored in said storage section;
a transmission section for transmitting, when an instruction to temporarily stop the playback of the image data is received, a message representing the reception of the instruction to said transmission apparatus through said network; and
a display control section for controlling, when the instruction to temporarily stop the playback of the image data is received, the storage section such that said storage section stores only one frame of the successive frames while playback of the image data is temporarily stopped and no longer updates the frame stored therein, and for controlling said display apparatus to repetitively read out and display the image data of one frame last stored in said storage section,
wherein said image data is received on a first channel of a predetermined transmission line and said instruction is received on a second channel of said transmission line.

18. An image processing apparatus according to claim 17, wherein, when an instruction to resume the playback of the image data is received, said transmission section transmits a message representing that the instruction to resume the playback of the image data is received to said transmission apparatus through said network, and said display control section controls said display apparatus to display the image data received thereafter by said reception section.

19. An image processing apparatus according to claim 17, wherein said storage section has a storage capacity at least for one screen.

20. An image processing apparatus according to claim 17, wherein said network can be a wired network which complies with the IEEE 1394 standard or a wireless network.

21. An image processing method, comprising:
a reception step of receiving successive frames of played back image data transmitted thereto from a transmission apparatus through a predetermined network;
a storage step of temporarily storing one frame of the successive frames of the played back image data received by the reception step into a storage section having a storage capacity of one frame of image data, the stored frame being replaced by a following frame of the successive frames that are received such that the frame stored in said storage section is updated with new successive frames that are received by said reception step;

a display step of displaying the received and temporarily stored image data;

a transmission step of transmitting, when an instruction to temporarily stop the playback of the image data is received, a message representing the reception of the instruction to said transmission apparatus through said network; and a display control step of causing, when the instruction to temporarily stop the playback of the image data is received, the storage section to store only one frame of the successive frames while playback of the image data is temporarily stopped and no longer update the frame stored therein, and for causing the repetitive read out and display of the image data of one frame last stored in said storage section, wherein said image data is received on a first channel of a predetermined transmission line and said instruction is received on a second channel of said transmission line.

22. An image processing apparatus, comprising:

a transmission apparatus for playing back successive frames of image data and transmitting the successive frames of image data through a predetermined network; and a reception apparatus for receiving the successive frames of image data transmitted thereto from said transmission apparatus through said network;

said transmission apparatus including a playback section for playing back image data, a transmission section for transmitting successive frames of the played back image data to said reception apparatus through said predetermined network, and a control section for controlling, when a message representing that an instruction to temporarily stop the playback of the image data is issued through said network, said transmission section to stop the transmission of the image data, wherein the control section establishes a first channel on a predetermined transmission line for transmission of said image data and a second channel on said transmission line for transmission of said message;

said reception apparatus including a reception section for receiving the successive frames of played back image data transmitted thereto from said transmission apparatus through said predetermined network, a storage section having a storage capacity of one frame of image data for temporarily storing one frame of the successive frames of the played back image data received by said reception section, the stored frame being replaced by a following frame of the successive frames that are received such that the frame stored in said storage section is updated with new successive frames that are received by said reception section, a display section for displaying the image data received by said reception section, a transmission section for transmitting, when an instruction to temporarily stop the playback of the image data is received, a message representing the reception of the instruction to said transmission apparatus through said network, and a display control section for controlling, when the instruction to temporarily stop the playback of the image data is received, the storage section such that said storage section stores only one frame of the successive frames while playback of the image data is temporarily stopped and no longer updates the frame stored therein, and for controlling said display section to repetitively read out and display the image data of one frame last stored in said storage section.

23. An audio/video processing apparatus connected to a network, comprising:

a reception section operable to receive successive frames of played back audio/video contents transmitted on a predetermined transmission line thereto from a transmission apparatus through a network;

a storage section having a storage capacity of one frame of image data for temporarily storing one frame of the successive frames of the played back audio/video contents received by said reception section, the stored frame being replaced by a following frame of the successive frames that are received such that the frame stored in said storage section is updated with new successive frames that are received;

a playback apparatus to play back the audio/video contents temporarily stored in said storage section; and a control section operable to control said playback apparatus to play back said audio/video contents received by said reception section and to control, when a message representing that playback of the audio/video contents is temporarily stopped is received through said transmission line, said storage section to store only one frame of the successive frames while playback of the image data is temporarily stopped and no longer update the frame stored therein, and to control said playback apparatus to repetitively play back and display the audio/video contents of one frame last stored in said one-frame storage section, wherein said image data is received on a first channel of said transmission line and said message is received on a second channel of said transmission line.

24. An audio/video processing apparatus connected to a network, comprising:

a reception section operable to receive successive frames of played back audio/video contents transmitted thereto from a transmission apparatus through a network;

a storage section having a storage capacity of one frame of image data for temporarily storing one frame of the successive frames of the played back audio/video contents received by said reception, the stored frame being replaced by a following frame of the successive frames that are received such that the frame stored in said storage section is updated with new successive frames that are received;

a playback apparatus to play back the audio/video contents temporarily stored in said storage section; and a control section operable to control said playback apparatus to play back said audio/video contents received by said reception section and to control, when a message representing a pause mode is received through a transmission line, said storage section to store only one frame of the successive frames while playback of the image data is temporarily stopped and no longer update the frame stored therein, and to control said playback apparatus to repetitively play back and display the one frame of audio/video contents last stored in said one-frame storage section based on the message representing a pause mode, wherein said image data and said message are received through different channels on said transmission line.

25. The audio/video processing apparatus according to claim 24, wherein said image data and said message are separately sent through said transmission line.

26. The audio/video processing apparatus according to claim 25,
wherein said control section establishes a first channel for transmission of said image data and a second channel for transmission of said message.

27. An audio/video processing method, comprising:
a reception step of receiving successive frames of played back audio/video contents transmitted thereto from a transmission apparatus through a network;
a storage step of temporarily storing one frame of the successive frames of the played back audio/video contents received by said reception step into a storage section having a storage capacity of one frame of video content, the stored frame being replaced by a following frame of the successive frames that are received such that the frame stored in said storage section is updated with new successive frames that are received;
a playback step of playing back the temporarily stored audio/video contents; and
a control step of controlling the playing back of the audio/video contents received in said reception step and controlling, when a message representing a pause mode is received through a transmission line, said storage step to store only one frame of the successive frames while playback of the image data is temporarily stopped and no longer update the frame stored in said storage section, and controlling said playback step to repetitively play back and display the one frame of audio/video contents last stored in said one-frame storage section based on the message representing a pause mode,
wherein said image data and said message are received through different channels of said transmission line.

28. The audio/video processing method according to claim 27,
wherein said image data and said message are separately sent through said transmission line.

29. The audio/video processing method according to claim 28,
wherein said control step establishes a first channel for transmission of said image data and a second channel for transmission of said message.

* * * * *